United States Patent [19]
Cardoza et al.

[11] Patent Number: 5,630,049
[45] Date of Patent: May 13, 1997

[54] METHOD AND APPARATUS FOR TESTING SOFTWARE ON A COMPUTER NETWORK

[75] Inventors: Wayne M. Cardoza, Amherst, N.H.;
Jeffrey M. Diewald, Billerica, Mass.;
Jeffrey E. Nelson, Milford, N.H.;
Steven D. DiPirro, Amherst, N.H.;
James R. Goddard, Candia, N.H.;
Wendell B. Fisher, Jr., Nashua, N.H.;
Anne E. McElearney, Groton; Richard Sayde, Littleton, both of Mass.

[73] Assignee: Digital Equipment Corporation, Maynard, Mass.

[21] Appl. No.: 347,614

[22] Filed: Nov. 30, 1994

[51] Int. Cl.$^6$ ..................................................... G06F 11/00
[52] U.S. Cl. ............................... 395/183.01; 364/570
[58] Field of Search .................... 395/183.01, 183.1, 395/183.11, 183.12, 183.14, 183.15, 184.01; 364/550, 570, 580

[56] References Cited

U.S. PATENT DOCUMENTS

| | | | |
|---|---|---|---|
| 4,312,066 | 1/1982 | Bantz et al. | 371/16 |
| 4,339,819 | 7/1982 | Jacobson | 371/16 |
| 4,481,574 | 11/1984 | Defino et al. | 364/200 |
| 4,589,068 | 5/1986 | Heinen, Jr. | 364/300 |
| 4,819,234 | 4/1989 | Huber | 371/19 |
| 4,985,893 | 1/1991 | Gierke | 371/16.2 |
| 5,022,028 | 6/1991 | Edmonds et al. | 371/25.1 |
| 5,228,039 | 7/1993 | Knoke et al. | 371/19 |
| 5,315,642 | 5/1994 | Fernandez | 379/96 |
| 5,394,544 | 2/1995 | Motoyama et al. | 395/575 |
| 5,410,681 | 4/1995 | Jessen et al. | 395/500 |

FOREIGN PATENT DOCUMENTS 0535821  4/1993  European Pat. Off. .

*Primary Examiner*—Hoa T. Nguyen
*Attorney, Agent, or Firm*—David A. Dagg; Denis G. Maloney; Arthur W. Fisher

[57] ABSTRACT

A method of remote debugging comprises a first computer system that communicates with a second computer using a network connection. The first computer system controls the remote debugging and comprises a first operating system. The second computer system comprises a second operating system and software being tested. User input, in the form of debug commands, is received using a remote debugger in the first computer system to control the remote debugging session. The remote debugger translates a debug command into messages that are sent from the first computer system to the second computer system. The messages correspond to tasks that the target computer system performs to complete the debug command. During debugging, the target computer system transitions between polling or stopped mode and interrupt-driven mode by transitioning both the target operating system and network hardware in the target computer system that interfaces with the network.

22 Claims, 10 Drawing Sheets

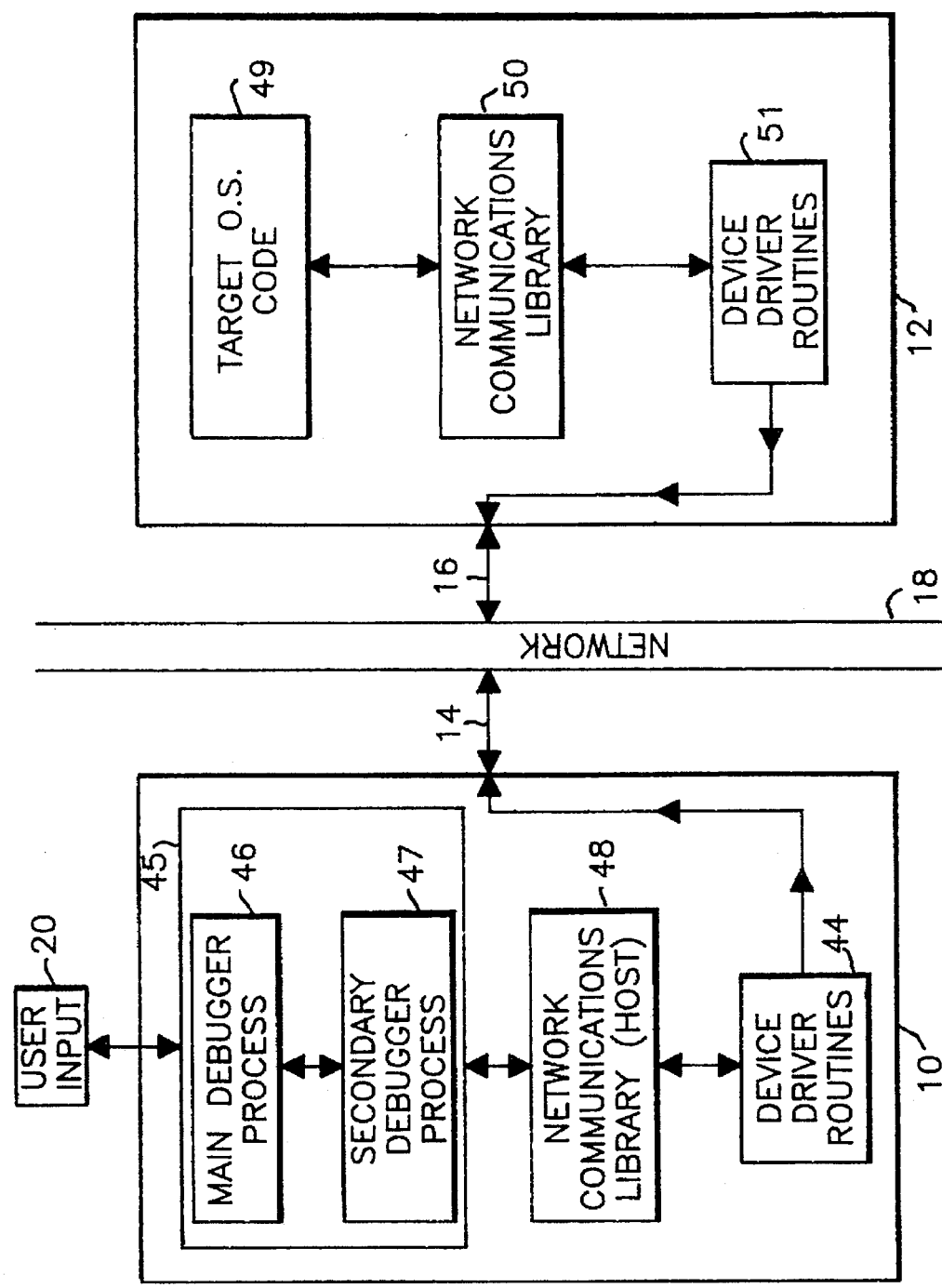

METHOD AND APPARATUS FOR TESTING SOFTWARE ON A COMPUTER NETWORK

FIELD OF THE INVENTION

The present invention generally relates to methods and apparatus for software testing and more specifically to providing remote testing of operating system code using a network to facilitate system software debugging and testing in a controlled testing environment.

BACKGROUND OF THE INVENTION

Software testing is an ongoing task in computer software program development and maintenance which requires a large portion of development time, computer and human resources, and effort. In particular, efficient testing and debugging of software that comprises a portion of an operating system in a controlled testing environment is often difficult due to the inherent nature of the software being tested.

An operating system may generally be described as software which provides an interface between hardware resources and a user to enable utilization of the hardware resources, for example.

Testing software may comprise exercising untested code, such as by executing all possible flow paths through a routine, to uncover existing software bugs. Once a problem is known, a testing environment must facilitate reproducing the problem, isolating the cause of the problem, and adequately testing possible solutions to the problem.

In order to properly test software, the testing environment must be flexible and rich enough to reproduce a wide range of problems. Then to adequately test a solution to a problem, the testing environment must also provide for replication of actual real-time conditions.

A user performing testing must be allowed to control the testing, such as by issuing commands that enable the user to single step through a portion of the code being tested. The user may also inquire about the state of the testing environment to aid in problem isolation and determining the cause of a problem, for example, a user may inquire about the state of an operating system by examining register contents.

Remote debugging is one method that facilitates problem isolation and determination and replication of real-time conditions. Remote debugging provides such a testing environment for debugging an operating system, for example, by having a first computer system that controls the testing and comprises a tested operating system connected to a second computer system which may comprise operating system code being tested. Controlling the testing from the first computer system allows a problem that is encountered on the second computer system during testing to readily be attributed to the untested operating system thereby facilitating problem isolation.

In existing remote debuggers, such as Remote dbx on Unix platforms and Hewlett Packard's RT kernel debugger, the two systems communicate through a dedicated communication line which may have a low communication bandwidth which generally makes debugging tasks slow. Further, a dedicated point-to-point connection is required between every two computer systems for each remote debugging session. In dedicated testing environments with point-to-point connections, such as a serial line connection, the computer systems generally must be in close physical proximity which limits the flexibility of the testing environment.

Generally, in remote debugging it is desirable to use a communication medium which removes such restrictions. It is desirable to use a communication medium which has a high communication bandwidth and affords a flexible testing environment.

It is desirable to use an existing computer system without having to specify new system configurations for debugging purposes. Further, it is desirable that the communication medium not impose a requirement for close physical proximity between the first and second computer systems.

In remote debugging, a user of the first computer system may control the testing by entering commands which result in one or more corresponding messages being exchanged between the two computer systems. It is desirable to have an efficient exchange of messages which correctly implements a given command. For example, a message exchange may be efficient by limiting the number of messages exchanged. Further, it is desirable to define an efficient division of labor of remote debugging tasks between the computer systems while simultaneously providing an adequate testing environment.

Other problems which may be dependent on the communications medium may arise in remote debugging. For example, if there is a problem with the hardware of the communications medium and the remote debugging session is terminated, it is desirable for the second computer system that comprises code being tested to efficiently and automatically restore its memory contents that may have been changed during the remote debugging session.

It is desirable to provide a method and apparatus for remote software testing that overcomes the foregoing and other disadvantages of remote software testing techniques and problems, and which further provide a more efficient means of remote software testing, and save software development time and resources. It is to these ends the present invention is directed.

SUMMARY OF THE INVENTION

The invention provides new and improved methods and apparatus for software testing in an efficient, isolated, flexible, and controlled software testing environment which improves software engineering productivity, increases product quality, and reduces the use of computer resources and developer time.

In accordance with the invention, a method of testing software on a computer network that comprises a host computer system and a target computer system. The software being tested resides in the target computer system. The host computer system includes a host operating system and a software debugger that controls testing of the software. The method comprising the steps of establishing, using the software debugger, a network connection between the host and the target computer system, transitioning the target computer system into a stopped state in which it awaits input from the host computer system and in which system interrupts are masked, issuing to the software debugger a debug command that indicates a function to be performed by the target computer system, determining one or more network debugging protocol messages defining steps necessary for the target computer system to implement the function indicated by the debug command, communicating the network debugging protocol messages to the target computer system using the network connection, performing the steps in the target computer system to complete the function indicated by the debug command, transitioning, in response to performing the steps, the target computer system between the stopped state and an interrupt-driven state, and reporting to the host computer system results of performing the steps and state information upon transitioning about the target computer system.

In another aspect, the invention also provides an apparatus for testing software on a computer network that comprises a host and target computer system. The software being tested resides in the target computer system. The host computer system includes a host operating system and a software debugger that controls testing of the software. The apparatus comprises an establishing means for establishing a network connection for communications between the host and target computer systems, transitioning the target computer system into a stopped state in response to the establishing means, issuing means for issuing a debug command that indicates a function to be performed by the target computer system, determining means for determining one or more network debugging protocol messages defining steps necessary for the target computer system to implement the function, communicating means for communicating the network debugging protocol messages to the target computer system using the network connection, performing means for performing the steps in the target computer system indicated by the debug command, transitioning means for transitioning the target computer system between the stopped state and an interrupt-driven state, and reporting means for reporting, to the host computer system about the target computer system, results of the performing means performing the steps and state information upon transitioning.

BRIEF DESCRIPTION OF THE DRAWINGS.

FIG. 3 is a block diagram illustrating the flow of control and communication between the various components of the debugging system of FIG. 1;

DETAILED DESCRIPTION OF PREFERRED EMBODIMENTS

The invention is particularly applicable to remote software debugging and will be described in that context. However, as will become apparent, the invention has greater utility.

GENERAL DESCRIPTION OF TESTING CONFIGURATION

Figure 1:
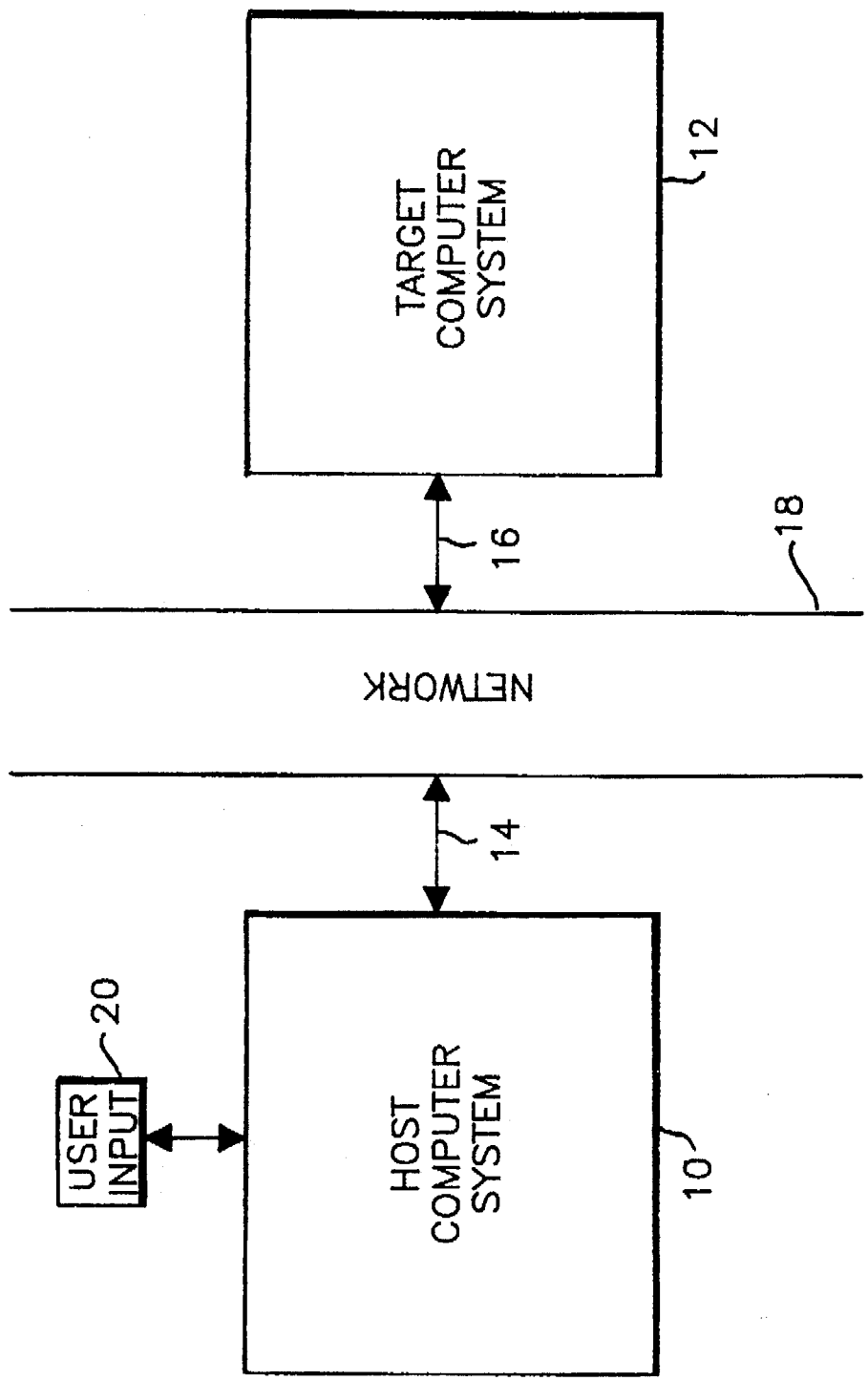
FIG. 1 is a simplified block diagram of a remote debugging system configuration in accordance with the invention.

FIG. 1 illustrates a simplified network configuration that may embody the invention. A host or client computer system 10 communicates with a target or server computer system 12 over a network 18. The host computer system communicates with the network using communication line 14. Similarly, the target computer system communicates with the network using communication line 16. The host computer system may comprise a tested operating system and may control the remote debugging of untested code, such as operating system code, on the target computer system through user input 20, such as a debug command to examine programming variables.

The configuration of FIG. 1 may be used to perform remote debugging of software, such as operating system software being tested, on a target computer system in an isolated testing environment by sending messages on the network between the host computer system and the target computer system. Specifically, debugging untested operating system software on a remote target computer system may proceed in a controlled testing environment by controlling the testing procedure with a debugger in a host computer system that comprises tested operating system software. This configuration allows the debugging to focus on the target operating system software being tested, and allows problems that are encountered in the target computer system during debugging to be attributed to the operating system software being tested.

Figure 2:
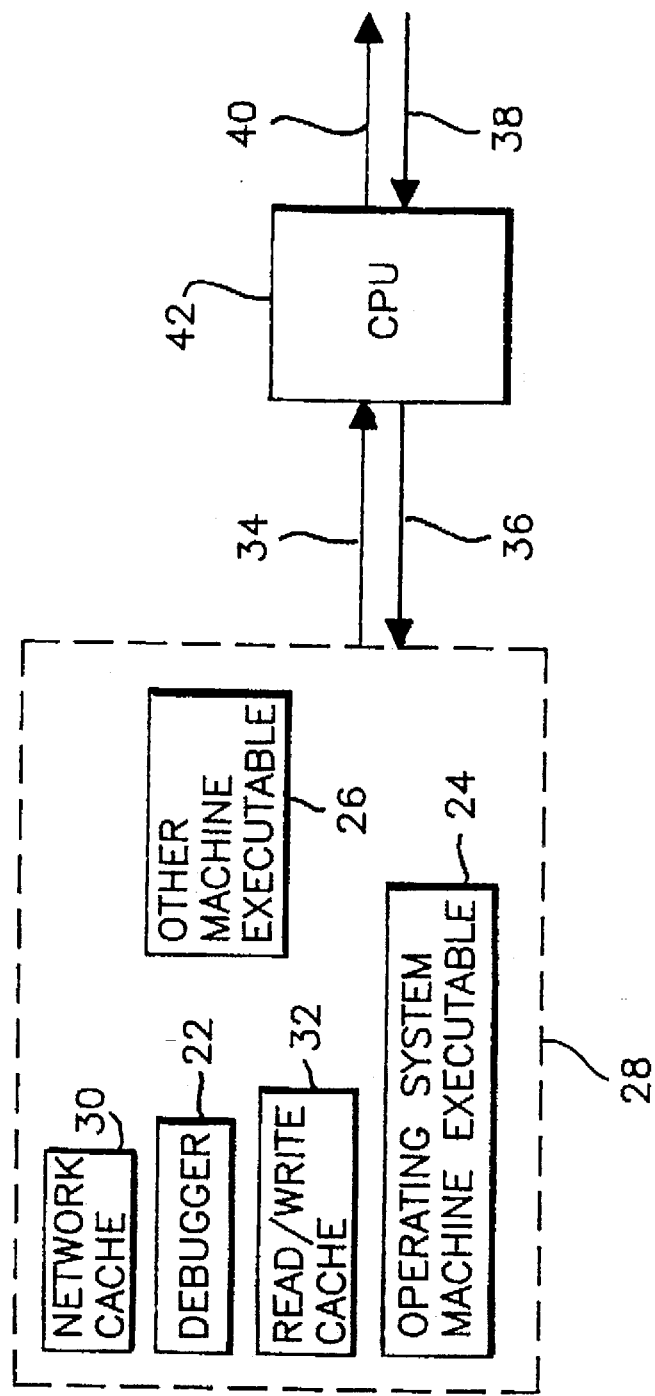
FIG. 2 is a simplified block diagram of a host or target computer system of FIG. 1.

FIG. 2 is a simplified illustration of a typical computer system which may be the host or target computer system of FIG. 1. The computer system may include memory 28, such as random access memory (RAM) or secondary storage, a central processing unit (CPU) 42, bus lines 34 and 36 which connect the memory and the CPU, and input and output lines 38 and 40, for example, to a network interface. A software debugger 22 and operating system machine executable code 24 may be stored in the memory. Additionally, a network cache 30 and read/write memory cache 32 may comprise a portion of the memory.

Functionally, a network cache may be used to reduce network traffic by, for example, saving information that is received over a network 18 in response to a message request. For subsequent message requests, the saved information may be reused rather than issuing another message request. Similarly, a read/write memory cache functions to further reduce network traffic by storing blocks of memory that are written and read from the target computer system. A particular use of the network cache and read/write cache will be described in following text.

The host computer system may include a software debugger that typically comprises machine-executable code executed by the CPU to test other machine executables 26. The other machine executables may be produced, for example, by compiling a software program to produce object code which is then linked, typically by a system linker, to produce machine executable code. Both the host and target computer systems may include operating system machine executable code which comprise machine instructions executed by the CPU to implement portions of an operating system. An example of operating system machine executable code is machine executable code for a device driver routine. The CPU reads in machine executable code from memory over bus lines 34 and executes the machine instructions. The operating system machine executable 24 or other machine executable 26 may be used for debugging purposes and comprise special debug information, such as debug symbol information. Such a machine executable to be used for debugging may be produced as by compiling and linking with special debugging options that are implementation dependent.

FIG. 3 illustrates the flow of control and communication between the various components of the remote debugging system configuration in accordance with the invention. A remote debugger 45 translates user input 20, such as a user debug command, into a series of one or more messages. Each message contains a request that the target computer system perform a task in accordance with the translated user input. The remote debugger 45 may be a two process model that comprises a main debugger process 46 and secondary debugger process 47. The main debugger process functions as an interface between a user and the secondary debugger process 47. The main debugger process performs user interface tasks and translates user input into a series of one or more messages. The secondary debugger functions as an interface between the main debugger process and the network communications library 48. The series of messages are communicated by the secondary debugger process 47 to the network communications library 48 which packages messages. The messages are then communicated to device driver routines 44 which interface with a network hardware device to send a message to the target computer system 12 over the network 18 using a network connection 14. A message is forwarded over the network to the target computer system through a network connection 16. A device driver routine 51 retrieves an incoming message on a specific network hardware device. The message is forwarded to the network communications library 50 for unpackaging and then to a portion of the target operating system code 49.

The target computer system 12 performs the functions indicated by the series of messages and reports results or status information back to the host computer system in the form of one or more messages. Specifically, a portion of the target operating system code comprises the software needed to perform remote debugging. Functionally, this portion of the target operating system 49 complements the remote debugger by implementing the functions indicated by a message sent from the host computer system.

A message that is sent from the target computer system to the host computer system follows a communications path in the reverse direction similar to the foregoing. The message may be sent by a portion of the target operating system code 49 to the network communications library 50 and then to a device driver routine 51 which interfaces with a network hardware device to send the message over the network 18 using the network connection 16. The host computer system receives the message from the network through a network connection 14. The message may be retrieved from a hardware device connected to the network by a device driver routine 44 which forwards the message to the network communications library 48. The message may then be sent to the secondary debugger process which notifies the main debugger process as needed depending on the specific message received. Messages may be sent from the target computer system to the host computer system, for example, to acknowledge receipt of a message or report information about the target computer system to the host computer system. The components of FIG. 3 will be described in more detail in following text.

REMOTE DEBUGGER

In more detail, the main debugger process 46 reads and translates a user debug command into one or more functional steps that correspond to a series of one or more specialized messages referred to as Network Debugging Protocol (NDP) messages to accomplish the user debug command. Generally, the NDP of the invention is a command/response protocol in which a command or request in the form of a message is issued by a sender to a receiver. The receiver may respond with a return message typically comprising the status of the executed command, or data. The messages comprising NDP may generally be classified as commands, reports and responses. Commands are those messages initiated by the host computer or client system of FIG. 1, for example. Reports are those messages initiated by the target or server computer system of FIG. 1, for example. Responses are those messages sent in response to a command or report message. The NDP and what may comprise an NDP message are described in more detail throughout the following text.

The main debugger process may perform a number of tasks. It may comprise machine executable code for the debugger user interface through which user debug commands are obtained and corresponding debug results displayed. The main debugger process may perform tasks such as syntactic verification of a user command, and determining the runtime address of symbol, such as a programming variable, or a line number.

The main debugger process calls the secondary debugger process 47 to issue an NDP message over the network. Functionally, the secondary debugger process is an interface between the main debugger process that communicates with the user, and the network. For example, the secondary debugger process may access and maintain information, which resides on the host computer system, about the target operating system code 49 being tested. Such information about the code being tested may include what runtime addresses in the target operating system code correspond to a given instruction. The secondary debugger process may also notify the main debugger process when the target computer system reports the occurrence of an event, such as the execution of a breakpoint instruction in the target computer system.

In this implementation, the knowledge of the message type may be embedded within the secondary debugger. Embedding message-type specific information within the secondary debugger makes it easier to isolate code that may be effected by use of another message type other than NDP.

In a preferred implementation, the remote debugger 45 may be developed by modifying an existing high-level language debugger (HLLD) such as one available for use with the OpenVMS for AXP operating system by Digital Equipment Corporation. The OpenVMS for AXP User Debugger is such a particularly desirable HLLD and will be used to describe the invention in more detail to enable remote testing of code residing on a target computer system from a host computer system. A HLLD may be characterized as a software debugger used in testing a machine executable produced by compiling and linking user application software written in a high level language, such as C, COBOL, or FORTRAN, as opposed to a low-level language debugger or a kernel debugger which is typically used in testing operating system code.

A high-level language debugger typically provides desirable user-friendly features that aid in debugging user programming applications generally written in a high-level language. The desirable features, such as full symbolic debugging with source line display, are not generally found in operating system and kernel debuggers due to the nature of the code debugged and the limited system services available when debugging an operating system. Because a HLLD is generally more user-friendly and provides more functionality than a low-level or kernel debugger used to test operating system code, it is therefore desirable to use a HLLD, as opposed to a low-level language or kernel debugger, when testing a user application or operating system code on the target computer system. Additionally, a preferred method of implementing a remote debugger 45 is to reuse portions of an existing debugger such that development time and maintenance may be reduced.

NETWORK COMMUNICATIONS LIBRARIES AND DEVICE DRIVERS

The secondary debugger process may communicate a message to the network communications library 48, for example, by passing information comprising the message as one or more routine parameters. Functionally, the network communications library "packages" and "unpackages" the data being sent in a message format. For example, in sending a message containing data representing an NDP command from the host to the target computer system, the network communications library may "package" the data in a message by adding a message header and trailer detailing the message contents, such as length in bytes of the message data. Generally, a message has a predefined format in which the data representing an NDP command, for example, is placed. The network message format is known to the network communications library which "packages" the message data to be sent. Similarly, a message received by the host computer system, for example, is "unpackaged" by removing any messages headers and trailers. The message data may then be passed to the secondary debugger process. Both network communications libraries 48 and 50 which reside on the host and target computer system, respectively, provide similar functionality depending on whether the respective computer system is sending or receiving a message.

On the host computer system, a routine in the network communications library 48 interfaces with the network to send a message to the target computer system 12 by calling the appropriate device driver routine 44. Similarly, on the target computer system a routine in the network communications library 50 interfaces with the network to send a message by calling the appropriate device driver routine 51. Generally, a device driver or driver is primarily responsible for communicating system and user input and output requests, respectively, to and from a designated hardware device. Each type of hardware device typically has a separate driver that may include one or more device driver routines. A device driver routine may comprise machine executable code produced by translating source code into object code, as by compiling, and then linking the object code to produce machine executable code. Functionally, the device driver performs device-specific tasks, such as maintaining programming variables to reflect hardware status, and interfacing with the designated hardware device, such as an Ethernet device. Various device-specific tasks which a device driver in this embodiment may perform are described throughout the specification.

The target computer system 12 may receive a message on its network connection 16 by using a device driver routine 51. The receipt of a message is a system event that typically causes a device interrupt to be signalled and execution control is passed by the target operating system to a previously designated device driver routine, or device interrupt handler. The previously designated device driver routine 51 may then communicate the message to another previously designated routine in the network communications library 50. In turn, this routine in the network communications library 50 communicates the message to a portion of the target operating system code 49 that is used in remote debugging. Similarly, a message received by the host computer system 10 on its network connection 14 is communicated by a device driver routine 44 to the network communications library 48 and then to the remote debugger 45. Generally, an implementation and operating system dependent signalling mechanism may be used to communicate a received message from a device driver routine 51 to the network communications library 50, and then to the target operating system 49. Similarly, the signalling mechanism may be used to communicate a received message from a device driver routine 44 to the network communications library 48, and then to the remote debugger 45. Typical signalling mechanisms may require a programmer to specify a computer process or routine to which control is passed when a specific message type is received by a device driver routine.

For example, in an preferred implementation of the invention when a message is received by the target computer system 12 which comprises the OpenVMS for AXP operating system, a device driver routine 51 signals a computer process or routine in the network communications library 50 and forwards to the computer process the received message by "queueing" an Asynchronous System Trap (AST) to the computer process. Rather, the AST signals the OpenVMS for AXP operating system to schedule the computer process for execution and forwards the message on a private process queue. The OpenVMS for AXP operating system then schedules the computer process for execution to handle the message. The computer process or routine in the network communications library 50 may then call a previously designated callback routine in the target operating system code 49. Similarly, a message received on the host computer system 10 may ultimately be passed to the remote debugger 45 by initially having a device driver routine 44 signal and forward the message to a first routine in the network communications library 48. The first routine may then communicate the message to the remote debugger 45 by queueing an AST to the secondary debugger process 47.

In a preferred implementation for remote debugging, the target operating system may comprise a debugger target kernel that was previously described as complementing the remote debugger in the host computer system. The debugger target kernel may be an operating system process that executes in a privileged mode, such as an operating system kernel mode, and implements the functional steps indicated by a received message. Note that other implementations of a debugger target kernel may include machine instructions contained within a read-only memory (ROM) or a programmable ROM (PROM).

NDP MESSAGES

Figure 3A:
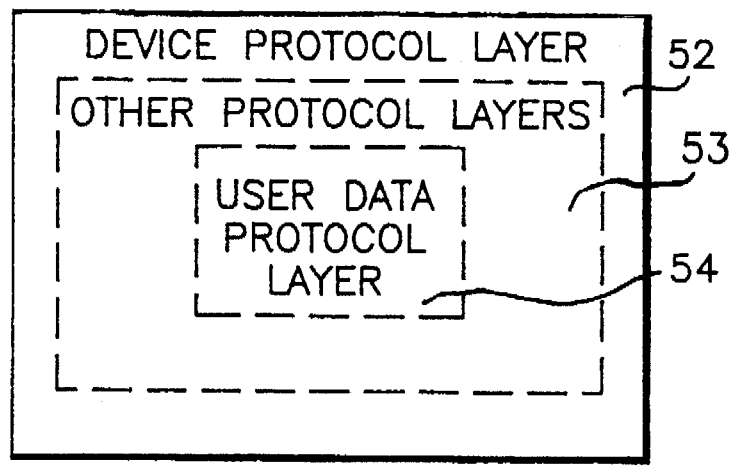
FIG. 3A depicts a conceptual picture of various message protocol layers that may comprise a message in accordance with the invention.
Figure 3B:
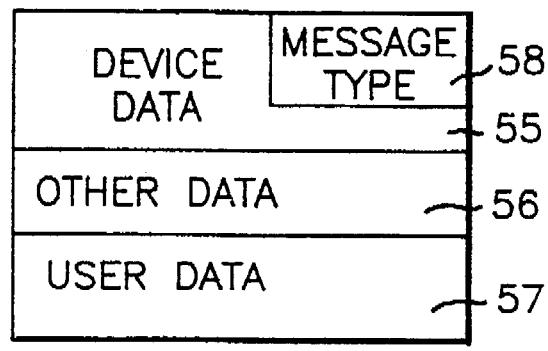
FIG. 3B illustrates a message that includes message data corresponding to the various protocol layers of FIG. 3A in accordance with the invention.

A message which is received, or sent, on a network by a device driver may comprise information for several different protocol layers such as a user data layer, that comprises the information of the NDP predefined message format, and a device protocol layer, such as an Ethernet protocol layer, that includes device specific information such as a physical device address. FIG. 3A illustrates a conceptual picture of the various protocol layers that may comprise a message in accordance with the invention. FIG. 3B depicts an actual message that includes a portions of message data, i.e., bytes of data, corresponding to each conceptual protocol layer of FIG. 3A. The device data 55 corresponds to the device protocol layer 53, the user data 57 corresponds to the user data protocol layer 54, and the other data 56 corresponds to the other protocol layers 53. Additionally, each portion of message data may be divided into a plurality of fields, such as the message type field 58 of the device data that comprises the device protocol layer.

Message data that corresponds to each protocol layer may be used and removed by a first portion of operating system software that implements a corresponding first protocol layer. The remaining message may then be passed to second portion of operating system software that implements a corresponding second protocol layer. For example, when a message is received, a device driver routine may remove a portion of the message pertaining to the device protocol layer, and pass on the remainder of the message, such as the information comprising the NDP predefined message format, to the network communications library. Similarly, a device driver may add the device specific, information to user message data corresponding to the user data layer and form a final message that is sent over the network. The device protocol layer typically includes a message type field 58 that contains a message type value used by the device driver to identify a callback routine or process in the network communications library which is to receive the message. The device driver may maintain a list comprising a message type value that indicates a message type such as NDP, and a callback routine corresponding to the receiver data value. Upon receiving a message that includes a particular message type value, the device driver then communicates the message to the corresponding callback routine in accordance with the list. Specifically, the device driver may extract the message type value from a received message, and search for a matching message type value in the list by comparing an extracted message to values in the list. Upon finding a matching message type value in the list, the device driver may communicate to the corresponding callback routine the remainder of the message that does not contain the device specific information.

The network communications library may then "unpackage" the message, as by extracting various data from the message, and communicate the extracted data, for example, to a designated processing routine. For example, in a host computer system comprising the OpenVMS AXP operating system, the network communications library 48 may extract portions of the message and communicate these portions to the secondary debugger process.

COMMUNICATION MEDIUM

Using a communications medium other than a point-to-point connection, such as a network connection, for remote debugging between a first and a second computer system provides both a higher communications bandwidth and greater flexibility for remote debugging by allowing any two computer systems on the network to function as the host and target computer systems. Further a network connection typically does not require hardware solely dedicated for remote debugging between each predetermined host and target computer systems. Therefore, designating another computer system as a host or a target computer system does not require hardware modifications.

However, using a network connection, such as an Ethernet network connection, rather than a serial line point-to-point connection, as used by existing remote debuggers, makes communications between a host and a target computer system for remote software testing more complex for various reasons. For example, with a network connection a message sent from a host computer system to a target computer system may be more complex because the message must identify a target computer system that may be one of a plurality of target computer systems. With a point-to-point connection, there is a single host computer system and a single target computer system, and, therefore, the message does not have to include information that identifies the target computer system. Additionally, using a network connection and a specific network device, such as an Ethernet, may create additional device dependencies and resource contentions. These problems may be avoided when using a point-to-point connection.

To establish communications between a host and target computer system, a preferred implementation embodying the invention may use an Ethernet network connection, comprising Ethernet device hardware, as opposed to a point-to-point connection, such as a serial line connection used in previous remote debugger configurations. There are advantages of using an Ethernet network connection rather than a point-to-point connection, such as a dedicated serial line connection. An Ethernet network connection, or Ethernet, is a fast communication medium with a high communication bandwidth. Additionally, no special dedicated connection is required to establish communications between the host and target computer systems. Typically, there is an existing general purpose network available which may be used to establish communications between the host and target computer systems.

Generally, any means of establishing network communications between the host and target computer systems may be used. However, a network connection, such as an Ethernet network connection, may have particular advantages, as previously stated.

In a preferred implementation embodying the invention that will be discussed in detail, both the host and target computer systems communicate messages using an Ethernet network connection and a private Ethernet 802.3 protocol in which the message type field value designates an NDP message. A message sent between computer systems for debugging purposes comprises a message type value designating the private Ethernet NDP. Upon receiving a message that comprises a message type value, a device driver may remove portions of the message which are device specific, i.e., comprise the Ethernet device protocol, and then communicate the remainder of the message and transfer control, as by calling a callback routine, to a processing routine in the network communications library previously designated as the NDP callback routine for received NDP messages. The NDP callback routine typically comprises code which "unpackages" the message, and dispatches the message to another previously designated processing routine, as a routine comprising the software debugger on the host computer system, or a routine included in the target operating system.

TARGET COMPUTER SYSTEM STATES

The target computer system may be in one of two modes: "polling mode", or "interrupt-driven mode". Note that in following text, polling mode may also synonymously be referred to as "stopped mode". When in polling mode, the target computer system is in a frozen or stopped state to enable, for example, examination of a programming variable that is used in operating system code being tested, and examination of register contents. Further, in polling mode, many of the target computer system's normal operations are suspended and the target computer system generally operates under the control of the remote debugger. Both hardware and software comprising the target computer system reflect this stopped state. When in interrupt-driven mode, the target computer system operates as it would under normal use conditions. More specifically, both system hardware and software are in a state such that typical system conditions exist and the target computer system does not appear to be frozen or stopped to a user. For example, the hardware devices and operating system are set such that a hardware device uses a typical communication signalling means to operate, i.e., device interrupts to signal completion of a task. Both of these modes will be described in greater detail in following text.

Figure 4:
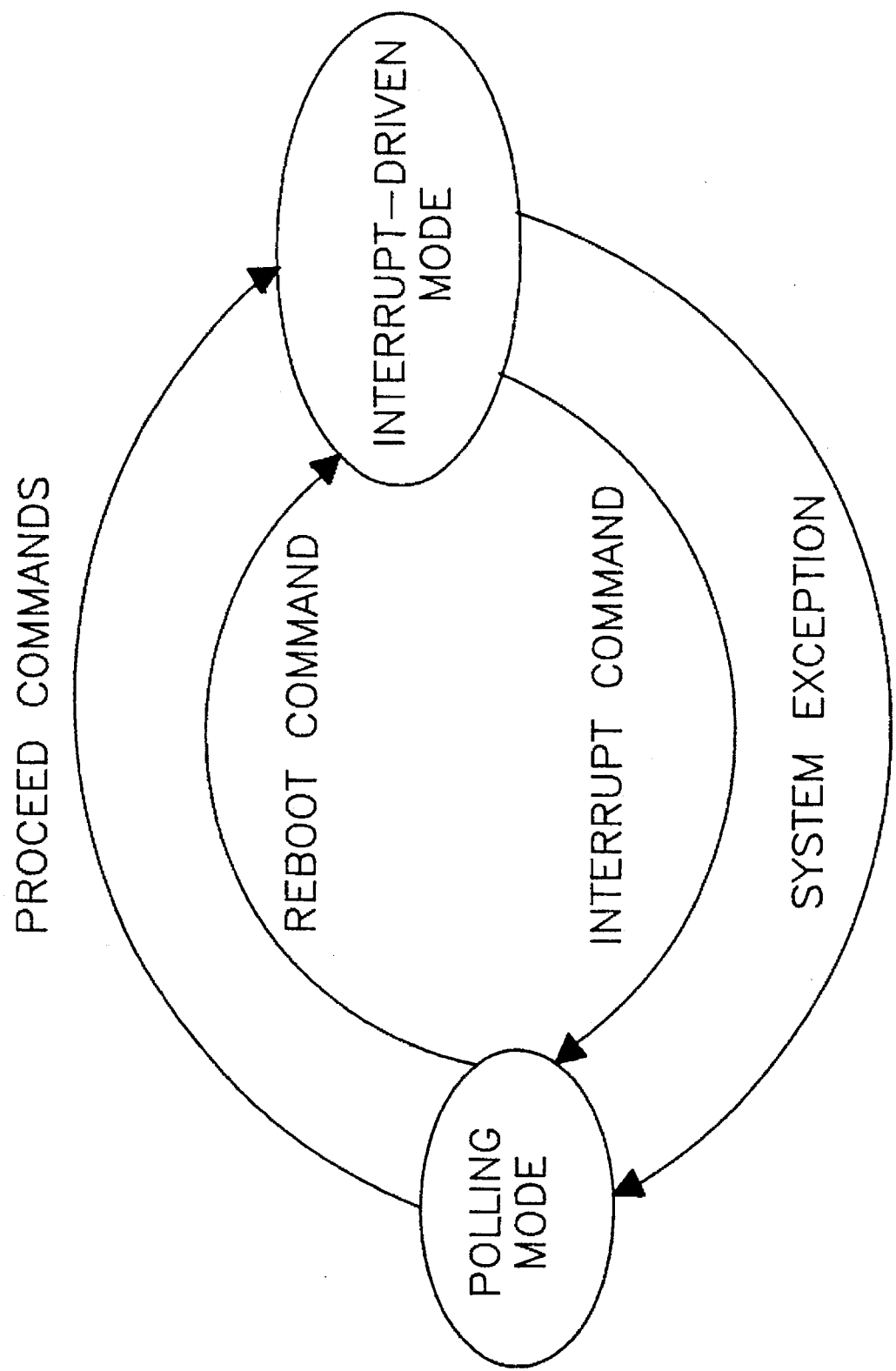
FIG. 4 is a flowchart outlining a method of the invention which places a target computer system in debug polling mode after the target computer system has been booted.

FIG. 4 is a state transition diagram that represents the two states or modes of the target computer system during remote debugging and the transitions which cause the target computer system to change modes.

Two particular system events may cause the target computer system to transition from polling mode to interrupt-driven mode. The first system event is when the target computer system receives a PROCEED NDP message from the host computer system. The PROCEED message indicates that the host computer system controlling the remote debugging session is instructing the target computer system to proceed with debugging by executing instructions located at the address contained in the program counter (PC) in the target computer system.

The second system event that may cause the target computer system to transition from the polling mode to the interrupt-driven mode is when the target computer system receives a REBOOT request NDP message from the host computer system. The target operating system reboots itself by, for example, entering the interrupt-driven mode and re-executing the operating system boot code. As will be described in more detail in following text, the target computer system may then transition to polling mode again when a BPT instruction is executed.

Once in the interrupt-driven mode, two particular kinds of system events cause the target computer system to transition into the polling mode. The first system event is when the target computer system receives an INTERRUPT NDP message from the host computer system instructing the target operating system to interrupt the currently executing process. For example, the target computer system may be in an infinite programming loop continuously executing a series of instructions. A user on the host computer system entering commands at a remote debugging session connected to the target computer system may observe the infinite loop execution. She interrupts the execution by, for example, inputting predetermined key strokes from a keyboard, such as simultaneously entering "CTRL" and "C", that indicate a user-generated debug interrupt command and cause the host computer system to send an NDP INTERRUPT message to the target computer system. This NDP INTERRUPT message may raise a target computer system interrupt causing the execution of a current process on the target computer system to be interrupted. Those skilled in the art of programming will note that interrupts typically have a pre-determined system priority level that may not pre-empt or interrupt a currently executing system process that executes at a higher priority level. An operating system typically handles interrupts according to pre-determined system priority levels.

The second system event that causes transition from interrupt-driven mode to polling mode is when a target computer system exception occurs as initiated on the target computer system. There are two general classes of such exceptions—error conditions and non-error conditions.

Error conditions indicate that an error has occurred while executing instructions on the target computer system, such as an invalid memory access due to an out-of-range memory address. When an error condition occurs, control returns to the target operating system as by a previously established exception handler, an NDP report message is sent to the host computer system reporting the error condition, and the target computer system remains in polling mode awaiting further messages from the host computer system.

Non-error conditions indicate that execution control on the target computer system is transferred to the target operating system in the polling mode, as by a previously established exception handler. The target computer system determines the context in which the non-error condition occurred, as by examination of register values and memory addresses, to determine subsequent action. For example, as will be described in more detail in accordance with FIGS. 6A and 6B, execution of a BPT instruction may indicate a non-error condition and may be executed in a plurality of contexts such as while executing instructions during booting of the target operating system, or executing a user-specified breakpoint previously set with a debug command.

GENERAL DESCRIPTION OF A PREFERRED IMPLEMENTATION

A preferred implementation embodying the invention will now be described in detail. Specifically, in this preferred implementation that will be discussed, both the host and target computer systems are running the OpenVMS for AXP operating system and communicate using an Ethernet network connection to send NDP messages. A portion of the OpenVMS for AXP operating system which resides in the target computer system may require testing and debugging. A stable, tested version of the OpenVMS for AXP operating system may reside on the host computer system. A network connection between the two computer systems may be established by booting the target computer system, and initializing, through sending a message using a remote debugger on the host computer system, the network connection request between the host and target computer systems. The target computer system may then respond to the initializing by sending a reply message with target system initialization information that is necessary for remote debugging. These steps of establishing a network connection are now described in more detail.

A target computer system may be booted and remain in polling mode or interrupt-driven mode after completion of the system booting. One typical way of booting a target computer system, such as one comprising an Alpha AXP processor and the OpenVMS for AXP operating system, is by entering a command, such as a BOOT command using a keyboard connected to a system console terminal. Functionally, "booting" a computer system causes boot code to be executed that initializes a computer system and is the process by which an operating system may assume control of the underlying computer system hardware. Additionally, operating system machine executable code may be loaded into memory and control then transferred to the operating system.

A user may boot the target computer system in one of the two alternate states by specifying various boot options, such as command line options and flags, that indicate polling mode or interrupt-driven mode. Using a mechanism, such as debug boot flags, may result in better utilization of target system resources by only performing certain tasks, such as loading debug-specific machine executable code into memory, as needed. For example, in an OpenVMS for AXP operating system, the BOOT command has command line options that, when specified, prepare a target computer system for remote debugging by, for example, loading required debugger machine executable code into memory. Additionally there are BOOT command line options that cause the operating system to remain in one of the two alternate runtime execution states or modes ready to receive debug commands from a host computer system.

A mode of the target computer system may comprise a particular software state of the operating system and a corresponding hardware state of a network device, such as an Ethernet network device. For example, in polling mode, the Ethernet device functions such that it does not signal an interrupt when a message is received on the target computer system. The Ethernet device must be polled or asked if it has received a message rather than the device signalling an interrupt. The target operating system is also in a corresponding state such that interrupts are masked out. To a user connected from a remote debugger, both the target operating system and the network device are stopped or frozen. In interrupt-driven mode, the Ethernet device signals an interrupt when it receives a message, i.e., interrupt-driven device. The target operating system is also in a corresponding state such that interrupts are not masked out. The target operating system does not appear frozen, i.e., user tasks and networking software may execute.

The target computer system may transition between the two modes by having the target operating system set its system interrupt level to correspond to the appropriate interrupt-driven or polling state, i.e., raised to mask out lower interrupts for polling mode, and lowered to allow normal interrupt-driven signalling mechanisms to function. Additionally, the target operating system may set a network hardware device state, such as the interrupt-driven state or polling mode, that corresponds to a target operating system state, by calling device driver routines 51, for example, which implement the hardware states by setting network hardware characteristics, such as an Ethernet adapter used in implementing the physical Ethernet network connection. Each of the two Ethernet device hardware states is necessary to implement its corresponding runtime execution debug mode. Details regarding when the switching between Ethernet hardware device states is performed are discussed in conjunction with the two debug modes in paragraphs which follow. The device driver routines 51 may be called directly from the operating system code 49, or the routines may be called indirectly through a routine in the network communications which in turn calls the correct device driver routine.

In this implementation, the target operating system uses two separate device drivers to set the appropriate Ethernet hardware state and facilitate communications in remote debugging. An OpenVMS for AXP boot device driver is used for communications when the target operating system is in polling mode. A normal interrupt-driven device driver is used for communications when the target operating system is in interrupt-driven mode. The functional difference is that the latter interrupt-driven mode is a driver that is typically used when not doing a remote debugging session, i.e., whatever device driver on an operating system functions when a computer system is typically being used. In an OpenVMS for AXP operating system, the boot driver is skeletal driver which generally functions only during booting of an Alpha AXP computer system. The interrupt-driven device driver may be characterized as a full-scale device driver that functions during normal operating system mode with a plurality of users. Due to the fact that each of these device drivers maintains a private copy of data which reflects the physical hardware state, it is necessary to insure that each of private copy of the data accurately reflects the current hardware state of the Ethernet card when the target operating system transitions between the two modes. One solution may use a global data area to communicate private data values when transitioning between modes. Another solution may initially set the hardware to a known physical state, and initialize private data values accordingly, each time a mode is transitioned to. The foregoing implementation issue and solutions may be relevant to a preferred implementation that uses the existing device drivers on an OpenVMS for AXP operating system to modify existing device driver routines.

When a target operating system is in polling mode, it may be in a "stopped" state, for example, repeatedly executing a code loop which polls for messages from the host computer system to the target system through boot drivers. Functionally, this stopped or polling mode freezes the operating system to enable execution of debug commands which may, for example, examine programming variables which represent the state of the operating system. The code loop may execute at the highest interrupt priority level (IPL) such that all system interrupts are masked out, i.e., the execution of the code loop is not interrupted due to a system event. In a preferred implementation using an OpenVMS for AXP operating system, the code loop may execute at an IPL of 31.

BOOTING A TARGET COMPUTER SYSTEM AND ENTERING POLLING MODE

Figure 5:
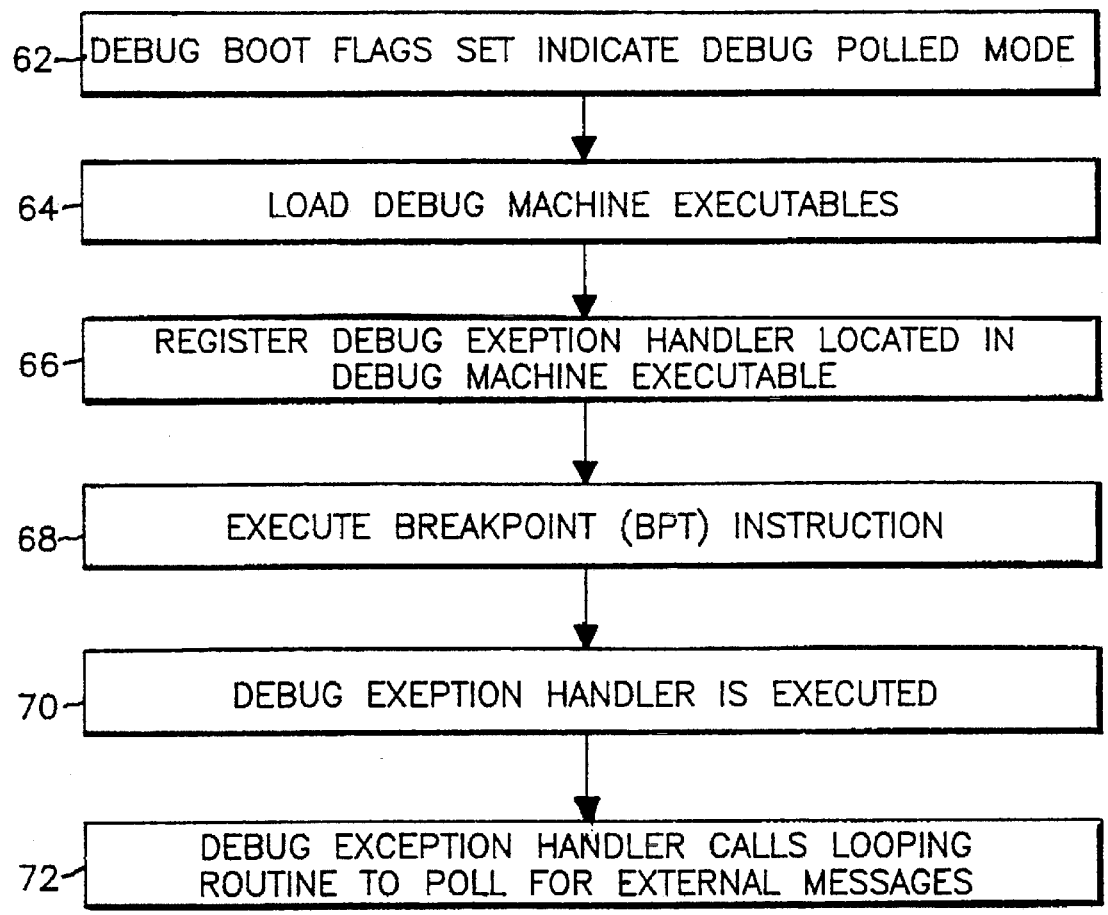
FIG. 5 is a state transition diagram that represents the operating system states and transitions between states during remote debugging of a target computer system embodying the invention.

FIG. 5 comprises a flowchart outlining process steps which place the target computer system in debug polling mode. The target computer system may be booted, as with a BOOT command flags on an OpenVMS for AXP system console, to indicate that the target computer system is to be left in the debug polling mode 62. During operating system booting, code may be conditionally executed which loads 64 into memory debug machine executable code, and registers 66 a special debug exception handler routine located in the debug machine executable code.

The debug exception handler may be registered by placing the address of the routine in a predefined location in system memory. The operating system dispatches execution control to the address specified in the predefined location in response to system exceptions. The debug machine executable code may be a portion of the target operating system code 49. Thus, when an operating system exception occurs, the operating system dispatches execution control to the debug exception handler routine and begins executing the routine's code to process the exception. The debug exception handler may comprise code which calls a looping routine to poll a network device, such as an Ethernet hardware device, for messages from the host computer system. An example of an OpenVMS for AXP operating system exception occurs when the CPU executes an Alpha AXP breakpoint (BPT) instruction.

Following registration of the debug exception handler, a breakpoint instruction may be purposefully executed 68 during booting to cause the target computer system to transition into polling mode. At this point, the operating system transfers control and begins executing the debug exception handler which, in turn, masks out interrupts, i.e., sets the IPL to 31, calls the appropriate device driver routine to set the network hardware, such as an Ethernet device, to its polling state, and then calls 72 the looping routine. The operating system continues to execute this looping routine 72 that polls the network hardware for messages from the host computer system.

If there is an existing network connection between the host and target computer systems, prior to invoking the looping routine, the target operating system may send an NDP report message to the host computer system indicating that the target operating system is in polling mode ready to process command messages from the host computer system.

The looping routine may implement the following pseudo-code or logical steps to poll for messages:

got_message=FALSE;
while (got_message is FALSE) call timer routine(got_message);
call get_message_from_ethernet();
dispatch to processing routine based on specific message;

The main loop routine may be part of the target operating system code 49 which calls a timer routine in the network communications library 50. The timer routine then calls the appropriate device driver routine that detects whether a message has been received on the network by the network hardware. The timer routine returns control to the looping routine with a result status indicating whether a message has been received or not. The timer routine may return this status in a return boolean parameter, such as got_message in the above example, in which FALSE indicates that no message has been received and TRUE indicates that a message has been received. The timer routine may also perform other functions such as calling the appropriate driver routines to reissue a message if, after a specified time period, an expected acknowledgement message was not received for a given message previously sent to the host computer system.

If the looping routine determines through examination of the timer return status that no message has been received, then the looping routine may again call the timer routine to poll the network hardware to determine if a message has been received. This looping process continues until the looping routine determines through examination of the timer routine return status that a message has been received. At this point, the looping routine may call additional routines in the network communications library 50 to retrieve the actual message received, unpackage the message, and return the data from the unpackaged message to the looping routine for processing. A message retrieval routine in the network communications library may retrieve the message received by calling the appropriate device driver routines. The message retrieval routine may also unpackage the message by, for example, removing a message header, and then placing return values in appropriate parameters which are returned to the looping routine to allow processing of the received message data.

In general, the looping routine may process received messages by examining the data returned by the timer routine to determine which NDP message has been received. The looping routine may then call another routine for processing of a specific NDP message type. Preferrably, there may be one routine, comprising the operating system code 49, per message type in which each routine is called by the looping routine as needed for message processing.

Depending on the message type of the message to be processed, the target computer system may remain in polling mode or transition into interrupt-driven mode. Various message types will be described in text which follows.

After processing a received NDP message which requires the target computer system to transition to interrupt-driven mode, the looping routine returns control to the exception handler or interrupt handler which "cleans up", respectively, the exception or interrupt processing generally by restoring the target operating system to the previous state in which it was prior to the interrupt or exception and setting the network hardware device to its corresponding state. However, as will be discussed in following descriptions of user debug, such as a STEP user debug command, a handler may wish to resume to a different operating system state, i.e., begin execution at a new memory address, rather than restore a previous state.

For example, in an OpenVMS for AXP operating system, contents of system hardware registers are saved to a particular "save area" of system memory when an interrupt occurs but also prior to invoking the interrupt service routine to process the interrupt. The address of the save area is stored in the hardware SP register. Typically, when an interrupt handler is finished processing an interrupt, it executes an Alpha AXP "return from interrupt" (REI) instruction causing the previously saved register values to be restored to hardware registers. The CPU resumes executing the next instruction that would have been executed if the interrupt had not occurred. Note that the Alpha AXP REI instruction also restores an IPL from this save area. Thus, interrupts are masked and unmasked, as determined by the IPL change.

In a preferred implementation, as will be seen in detail in following descriptions, an exception handler may restore the target operating system to interrupt-driven mode by lowering the IPL to enable interrupt processing mode, and by executing an REI instruction which causes the operating system to restore previously saved register contents, such as the address of the instruction that was being executed when the exception occurred, and resume executing instructions based on the restored information.

The state of a particular target computer system, i.e., hardware and software, may be described in a plurality of ways that vary with each implementation. Therefore, the precise steps taken to change states may also vary with implementation. For example, the number and type of hardware registers used to reflect the state of the target computer system may vary and therefore, so will the information that is saved and restored upon a state change. Further, a particular architecture may include a machine instruction, such as the Alpha AXP REI instruction, which performs one or more of the precise steps, such as restore registers and an IPL that affects system interrupts and system hardware operations.

In addition to registering a special debug exception handler during booting, other special handlers or special routines may be similarly registered to process other system events. The previously described "exception handler" may process system events classified as "exceptions", such as executing a BPT instruction. Similarly, an "interrupt handler" may be invoked to process system events classified as "input and output (I/O) interrupts", such as receiving a message from the network via the Ethernet hardware.

There are generally two classes of system events that may be reported to a CPU, such as an Alpha AXP processor that may comprise the host and target computer systems, and cause the CPU to change the instruction stream currently being executed to another instruction stream to handle the system event. These two classes of system events may be characterized as exceptions and interrupts. Generally, an exception may be a system event relevant to the currently executing process, such as an arithmetic exception, or the execution of a pre-determined special machine instruction, such as a breakpoint instruction. An interrupt may be a system event caused by a source external to the currently executing instruction stream, such as an I/O device, or a system clock. A programmer may specify an alternate instruction stream, such as an interrupt handler routine or exception handler routine, to be executed in response to a specific system event occurring.

When booting the target computer system using a BOOT command, the BOOT flags may also indicate that the target computer system is to remain in the interrupt-driven mode as opposed to the previously described polling mode. Interrupt-driven mode may be characterized as a "normal" or non-debug mode in which the operating system may remain regardless of whether or not the operating system is enabled for remote debugging. At the end of operating system startup, interrupts are not masked out, i.e., the IPL is not purposefully raised to 31 which would block all system events. Rather, the operating system is purposefully set to the "normal" IPL and retains a "normal" start state, i.e., the IPL and start state that the operating system retains if there is no remote debugging.

When a message is received by the target operating system which has been booted with the boot flags indicating the initial debug mode as interrupt-driven, as previously discussed, a device driver routine, or device interrupt handler, initially has execution control. The device driver routine may then forward the message to the network communications library 50, either by a directly invoking a callback routine or by placing the message on a queue associated with a designated process or routine to be scheduled for execution by the operating system. The callback routine or designated process in the network communications library may call a routine in the target operating system code 49 passing message data as a parameter.

Once the target computer system 12 has been booted with the proper options leaving its operating system in a runtime mode ready to receive messages through a network 18 from a host computer system 10 for debugging, i.e., "polling mode" or "interrupt-driven mode", a remote debugger 45 may be started on the host computer system.

In a preferred this implementation, the target computer system is booted and remains in debug polling mode by following the process steps of FIG. 5.

EXECUTING A BREAKPOINT INSTRUCTION

Figure 6A:
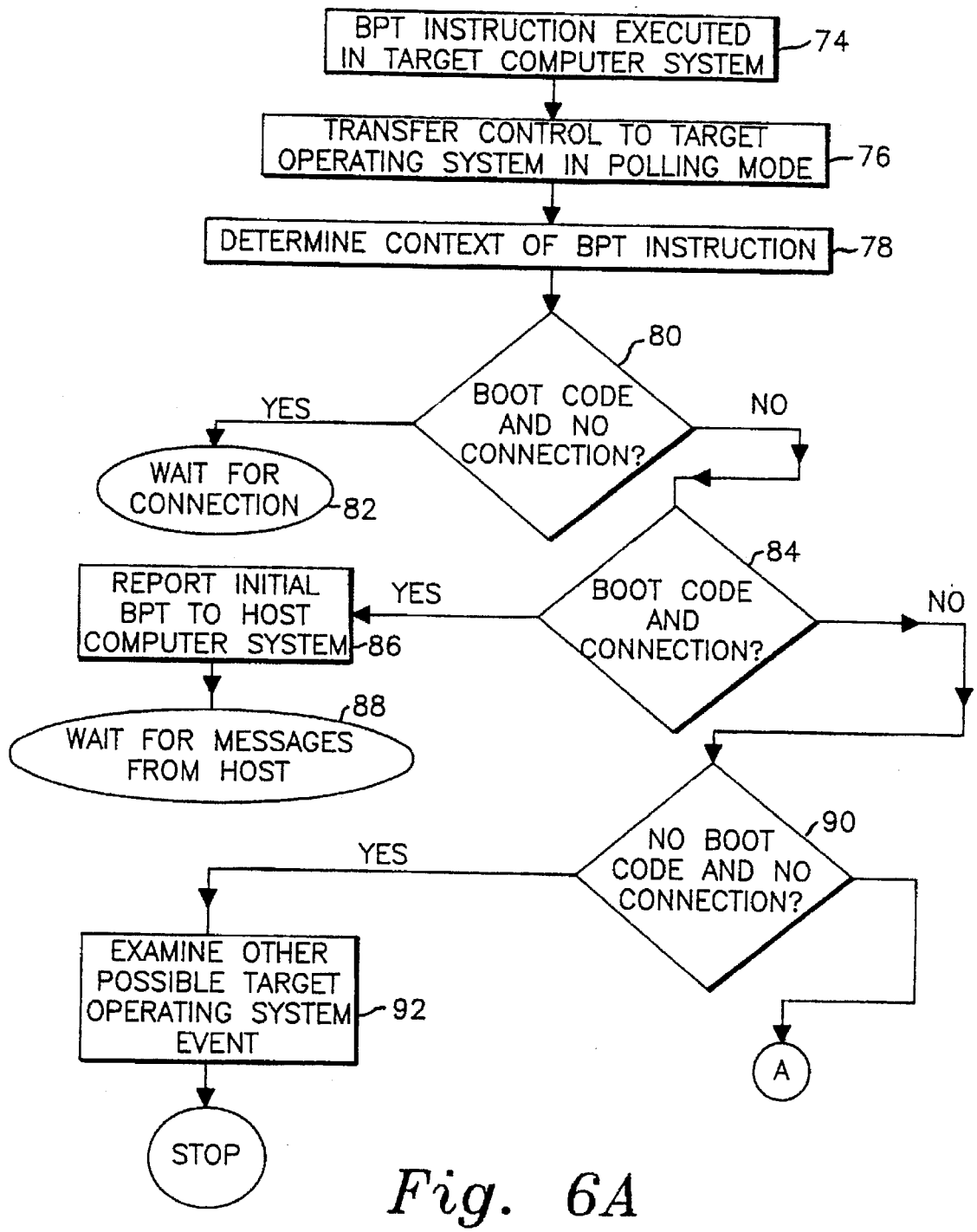
FIGS. 6A and 6B comprise a flowchart illustrating the steps the target computer system may execute when a breakpoint (BPT) instruction is executed in a target computer system.
Figure 6B:
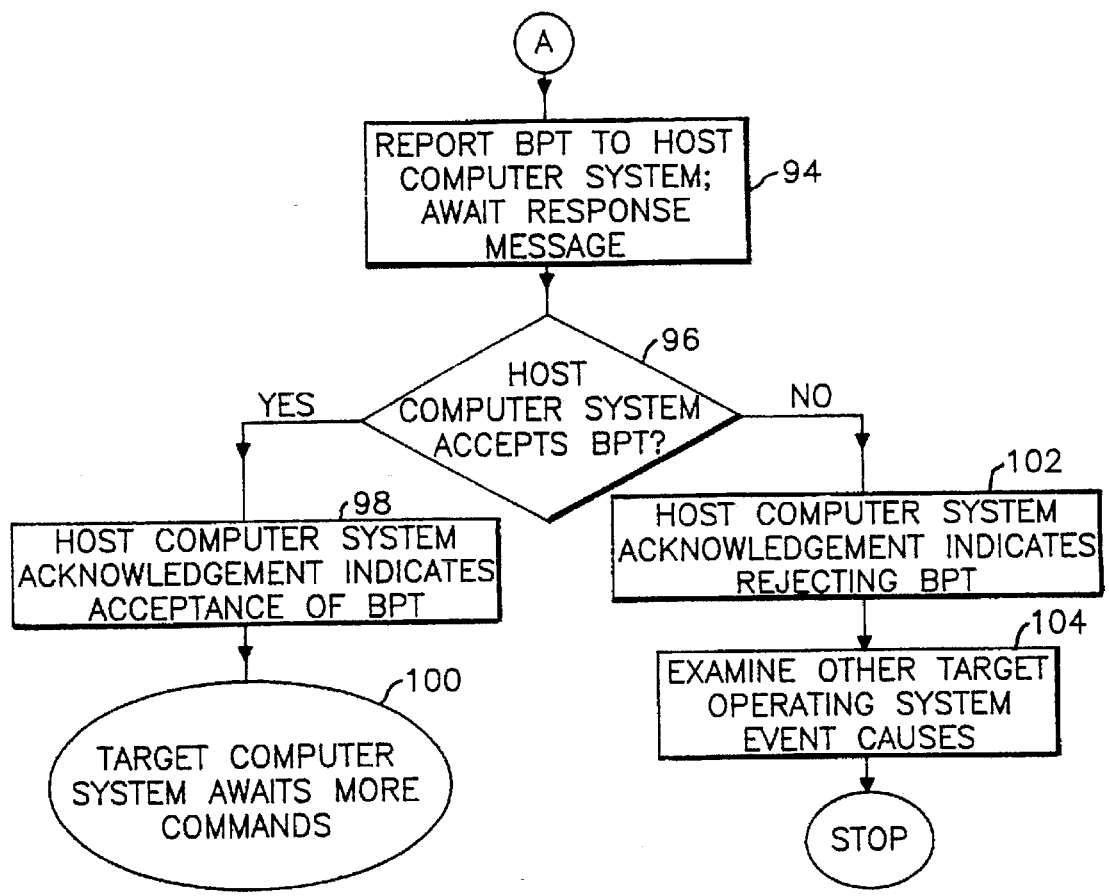

FIGS. 6A and 6B comprise a flowchart illustrating the process steps that may be executed by the target computer system when a breakpoint instruction is executed 74 in the target computer system, as when a breakpoint instruction is executed during target computer system booting. When a breakpoint instruction is executed, execution control may be transferred 76 to the target operating system in polling mode. The current context in which the breakpoint instruction occurred is determined 78. The current context may be one of four predetermined contexts defined by whether the breakpoint instruction executed is included in boot code, and whether there is an existing debug network connection to a host computer system. A first predetermined context is determined 80 when the BPT instruction executed comprises system boot code and there is no existing debug network connection. If the current context is determined to be a first predetermined context, the target operating system may remain in polling mode 82 waiting for a network connection.

A second predetermined context is determined 84 when the breakpoint instruction executed comprises system boot code and there is an existing debug network connection. If the current context is determined to be a second predetermined context, the target operating system may report 86 the execution of the breakpoint instruction to the host computer system by sending an NDP report message. The target operating system remains 88 in the polling mode and awaits for messages from the host computer system.

A third predetermined context is determined 90 when the breakpoint instruction executed does not comprise system boot code and there is no existing debug network connection. If the current context is determined to be a third predetermined context, the target operating system may examine other possibilities 92, such as other target operating system processes, that may have caused the breakpoint instruction to be executed.

A fourth predetermined context is determined when the breakpoint instruction executed does not comprise system boot code and there is an existing debug network connection. If the current context is determined to be a fourth predetermined context, the target computer system may report 94 the execution of the breakpoint instruction to the host computer system by sending an NDP report command including an address on the target computer system indicating the address of the breakpoint instruction. The target operating system may then wait for a response or acknowledgement message from the host computer system 96. The host computer system sends an NDP response message indicating acceptance 98 of the breakpoint instruction if, for example, the software debugger determines that the address of the executed breakpoint instruction matches the address of a user-specified breakpoint. The target operating system may then wait 100 in polling mode for further commands. Alternatively, the host computer system may send an NDP response message 102 indicating rejection of the breakpoint instruction if, for example, the address of the executed breakpoint instruction does not match the address of a user-specified breakpoint. The target operating system then may examine other possibilities 104, such as other target operating system processes, that may have caused the breakpoint instruction to be executed.

As previously described, the target operating system may initially enter polling mode, as caused by the execution of the breakpoint instruction while executing boot code, for example, of an OpenVMS for AXP operating system. Alternatively, for remote debugging, a target operating system may initially enter interrupt-driven mode and transition into polling mode, as by some other system event which raises an interrupt or exception on the target operating system. For example, the target operating system may be initially booted with flags that cause necessary debug machine executables to be loaded into memory, and leave the target operating system in interrupt-driven mode. No debug network connection is yet established. An NDP message received from the host computer system may cause a target operating system interrupt that results in the execution of a previously designated interrupt handler. The interrupt handler may then cause the target operating system to transition from the interrupt-driven mode to the polling mode and proceed as previously described.

DESCRIPTION OF A REMOTE DEBUGGING SESSION

In a preferred implementation, the target operating system is booted and remains in polling mode waiting for messages from the host computer system to establish a network connection. Using the previously described two process debugger model, the main debugger process on the host computer system may be placed into a runtime execution state by, for example, by logging onto the host computer system and establishing a user session, and entering a system RUN command from a keyboard and terminal connected to the user session. The RUN command may cause the main debugger process 46 and secondary debugger process 47 to be loaded into memory 28, and may cause the CPU 42 to begin executing instructions in the main debugger process.

The main debugger process may remain in a runtime state ready to accept debug commands entered from the keyboard or other input device. At this point, a user may enter a debug command with proper target computer system information, such as a CONNECT command with parameters specifying a target computer system node name, and a target computer system password, to enable the host computer system to initialize a network connection using the network 18 and communication lines 14 and 16. In this embodiment, the main debugger process may read an entered debug command, syntactically recognize the entered debug command and any parameters, as by searching a list of known debugger commands for the entered debug command, and semantically interpret the entered debug command and its parameters, as by using parsing methods and techniques, such as recursive descent parsing known to those skilled in the art. The main debugger process may translate the debug CONNECT command and its parameters into an NDP system initialization message (CMD_INIT).

The main debugger process may call a first routine in the secondary debugger process which, in turn, calls a second routine in the network communications library 48. The main debugger process may communicate data, which is needed for sending an NDP system initialization message, to the secondary debugger process by passing information as parameters when calling the first routine. In turn, the first routine in the secondary debugger process calls a second routine in the network communications library. The secondary debugger process may perform tasks such as arranging parameters in the proper order for the specific network communications library routine called. Additionally, the secondary debugger process may store information into memory on the host computer system for future use as dictated by the debug command and the details of a specific implementation.

The second routine in the network communications library on the host system may "package" the information in a predetermined message format by, for example, adding a message header before the actual message data, and a message trailer indicating, respectively, the start and end of the message, i.e. stream of bits. The message header may contain additional information that further describes the message itself. For example, the message header may include a byte count indicating the quantity of bytes contained in the actual message data.

The second routine may send the message on the network 18 by calling a device driver routine 44 to communicate with the Ethernet hardware and send the message to computer systems on the network. A system on the network, such as the target computer system 12, receives the message through a device driver routine 51. Execution control is passed from the device driver routine to a routine in the network communications library 50 which "unpackages" the message and passes it to the target operating system 49 which is in polling mode waiting for a message requesting a network connection.

ESTABLISHING A NETWORK CONNECTION AND USE OF INCARNATION NUMBER

In establishing an initial network connection, the looping routine, previously described as being included in the target operating system code 49, may determine that the message received is an NDP initialization request message (CMD_INIT) and calls the appropriate processing routine. Functionally, the CMD_INIT routine initializes or re-initializes a remote debugging session between the host and target computer systems by causing the operating system code 49 to enter into the polling mode by, for example, calling the looping routine from the CMD_INIT routine. The CMD_INIT routine may also perform other tasks during initialization such as setting programming variables to indicate that the polling mode has been entered.

For a remote debugging session, the CMD_INIT message must be the first command message sent from the host computer system to the target computer system. Once a network connections has been established, the CMD_INIT command message may be sent again causing the target operating system code 49 to re-initialize itself. The CMD_INIT routine may, for example, initialize tables or other data structure used in a remote debugging session.

The CMD_INIT message may comprise information which the host computer system needs to send to the target computer system to establish network communications. For example, the CMD_INIT message may include the password for the target computer system previously entered as a parameter of the CONNECT debug command. The password may be "packaged" into the CMD_INIT message sent from the host computer system to the target computer system. To establish a network connection, the initial CMD_INIT message may be required to contain a password on the target computer system which is properly verified when the target computer system receives the CMD_INIT message, as will be discussed below.

In response to receiving the CMD_INIT message, the target computer system unpackages the message, and may send an NDP response message RESP_INIT to the host computer system by, for example calling a RESP_INIT routine in the operating system code 49. Functionally, the RESP_INIT message returns a status of the CMD_INIT message request indicating if the network connection request was accepted. To accept a network connection request, for example, after the CMD_INIT message is unpackaged, an NDP password validation may be performed by calling a validation routine from the CMD_INIT routine. The validation routine may determine if the password is valid by, for example, searching an existing password file that comprises valid passwords on the target computer system for a respective match to the password received in the CMD_INIT message. A network connection request or CMD_INIT message may not be accepted if, for example, the password contained in an NDP CMD_INIT message is incorrect. A value indicating this rejection status may be passed back as part of the RESP_INIT message. Similarly, if the password received is valid, i.e., a match is found in the existing password file, the RESP_INIT message indicates an acceptance of the network connection request.

Additionally, information about the target computer system, such as an incarnation number and the address locations of certain executable code images comprising the operating system code 49, may comprise the RESP_INIT message. An incarnation number identifies a particular boot of the target computer system. If the target computer system reboots, a new incarnation number identifies that particular reboot. The incarnation number contained in a RESP_INIT message identifies the particular boot of the target computer at the time this network connection is established.

Note that the use of a particular password for remote debugging in the target computer system is illustrative of a general security mechanism to authorize a network connection between two computer systems. Implementations may include other security mechanisms employing both an account and password, for example.

Additional security measures may also exist in a preferred implementation of the invention. For example, information indicating a particular remote debugging session may appear on a system console of the target computer system for an additional visual security monitoring.

Figure 7:
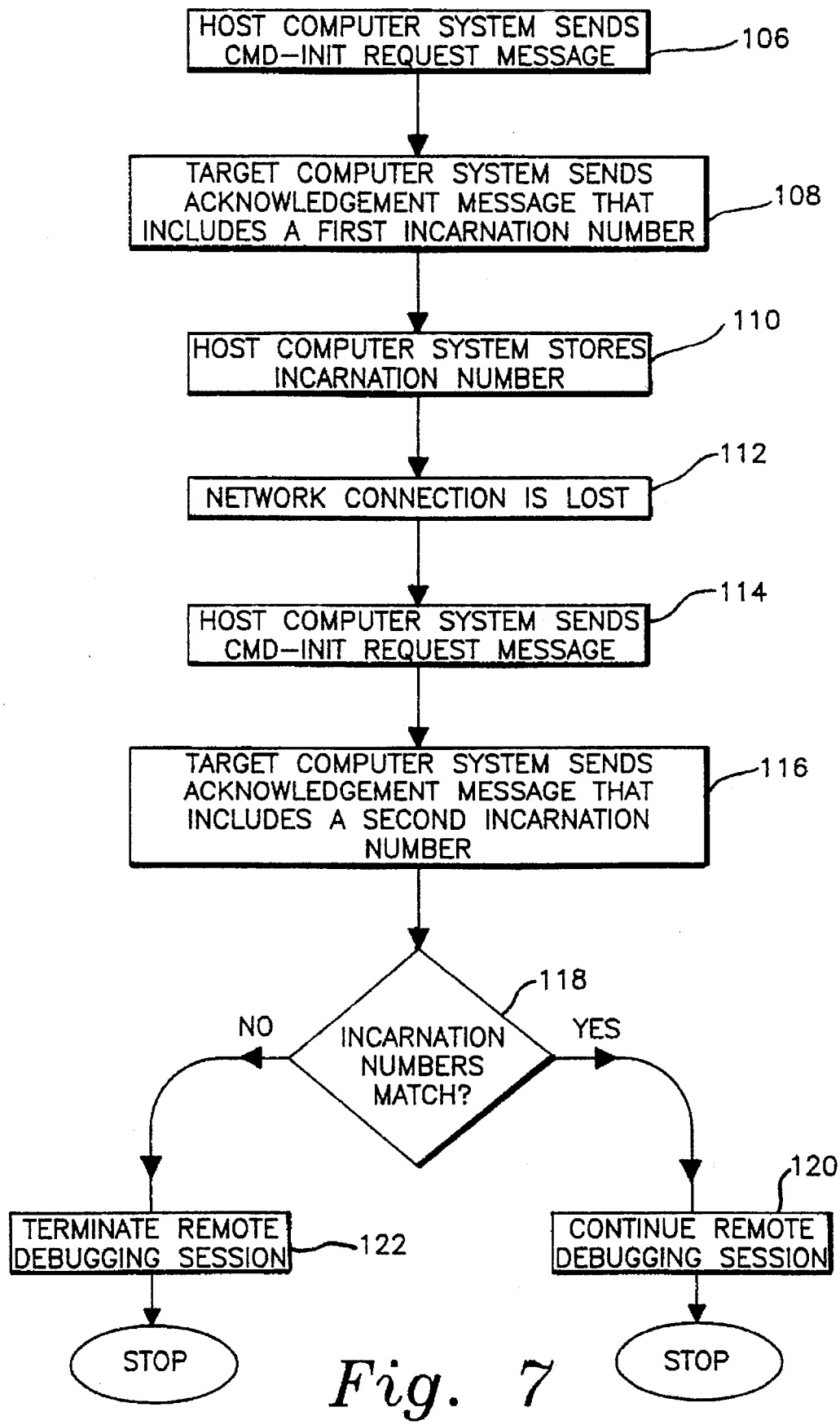
FIG. 7 is a flowchart outlining a process in accordance with the invention in which a host computer system receives and uses an incarnation number to reestablish a network connection.

FIG. 7 outlines the steps of how the host computer system receives an incarnation number and may use it to reestablish a network connection. As previously described, the host computer system sends a CMD_INIT message to the target computer system 106. The target computer system responds with a RESP_INIT message 108. When the RESP_INIT message is received, the host computer system may store 110 in its memory the information about the target computer system contained in the RESP_INIT message for use in executing commands during the remote debugging session. The host computer system may store the incarnation number which may be used when an existing network connection between the host and target systems is unintentionally terminated 112 due to network problems, for example, during a remote debugging session. The host computer system may try to immediately re-establish a network connection by sending another CMD_INIT message 114. The target computer system responds with an RESP_INIT message that contains a second incarnation number 116. Upon receiving the RESP_INIT message, a routine in the secondary debugger process may compare the second incarnation number with a previously stored incarnation number that corresponds to that particular boot of the target computer system prior to losing the network connection 118. If the two incarnation numbers match 120, the previous remote debugging session may resume and the debugger may use information stored previously about that particular debugging session and the target computer system. If the two incarnation numbers do not match 122, the target computer system has been rebooted and the host computer system may abort the network connection and the remote debugging session. The state of the target computer system, such as physical memory addresses of executable code, may have changed and the debugger is unable to use previously stored information about the target computer system.

An incarnation number may be a numeric value generated by numerous methods. For example, an incarnation number may be a value generated from the time of a target computer system clock. While booting a target computer system that comprises an OpenVMS for AXP operating system, a 64-bit clock value may be generated by concatenating two different 32-bit clock values. The two clock values are obtained by recording the system clock before and after an I/O operation that occurs during the boot process. The incarnation number may be placed in memory in the target computer system and may be available for use as needed during the remote debugging session. For example, the network communications library may use the incarnation number when packaging a RESP_INIT message.

In order to maintain and operate a user debugging session to test the target operating system, information that describes the software being tested may reside on either the host or target computer systems. Certain factors may be considered when determining in which computer system particular debug information should reside. One factor is the frequency of use of files by a computer system. If a file containing debug information is frequently used by the remote debugger, for example, it may be more efficient for an implementation to have the files reside in the host computer system. Another factor to consider is the size of the file. Since it is desirable to minimize the perturbations of the target computer system and its address space for testing purposes, large files may optimally reside in the host computer system.

When files used during debugging reside on both computer systems, the remote debugger, for example, needs to be able to access the files on both computer systems and determine what particular file is needed during debugging. An implementation of the invention may include such file information, for example, as part of the RESP_INIT message.

Once an initial network connection between the host and target computer systems is established, a user on the host computer system may begin issuing user debug commands to test the target operating system code 49. At this point, the target operating system may be in polling mode. These user debug commands may be entered on the host computer system by using the terminal, keyboard and mouse, for example, associated with the previously described session on the host computer system. As previously discussed, the user debug commands are processed by the main debugger process 46 and translated into a series of NDP messages by the secondary debugger process 47. In turn, the NDP messages are sent to the target computer system using the network communications library 48 and device driver routines 44 and network 18.

DEBUG STEP COMMAND

The STEP command is a user debug command which allows a user to single step through source code being tested on the target computer system. An implementation of the STEP command in accordance with this invention is outlined in FIG. 8. The remote debugger tells the target operating system, through a series of NDP messages, to execute a series of machine instructions that correspond to the single source code statement. Using debug information, such as a debug symbol table, previously generated as by compilation, the remote debugger determines the address range of machine instructions that correspond to the single source statement to be executed 124. The address range and the debug information correspond, respectively, to target operating system addresses and program symbols. The remote debugger issues an NDP READ request message 126 that may include a starting address in memory on the target computer system and may specify a length in bytes indicating the size of the data area to be returned by the target computer system. The target computer system is currently in polling mode and receives the request and the target operating system code retrieves the requested data, i.e. machine instructions, from its memory. The target computer system issues 128 an NDP READ response (READ_RESP) message that includes the requested data.

Upon receiving the NDP READ_RESP message, the remote debugger may analyze the machine instructions included in the requested data, and use a copy and execute method controlled by the remote debugger to execute, on the target computer system, a copy of machine instructions that correspond to the single source statement. The copy and execute method comprises allocating scratch memory on the target computer system, placing a copy of the machine instructions into a portion of the scratch memory, modifying some of the instructions, and then executing the copy of the machine instructions in the target computer system. Each of the steps of the copy and execute method and analysis of machine instructions is described in more detail in following text.

Some memory allocation and management scheme is needed for the copy and execute method. A preferred implementation of the invention may initially allocate a large segment of scratch memory in the target computer system for use by the remote debugger. This initial allocation may be done by specifying a predetermined number of bytes as a BOOT command parameter during booting of the target computer system. When the remote debugger needs memory on the target computer system, a portion of the initial large segment may be marked or designated as "used" by the remote debugger 45. Thus, the large segment may be used one portion at a time as needed by the remote debugger. The management of the scratch memory, such as keeping track of what portions of the scratch memory have been used or allocated, may be done by the host computer system using methods known to those skilled in the art. For example, maintaining a list of information about each allocated portion, such as starting address and size of a portion, allows the remote debugger to free and reuse fragments of the scratch memory. Note that in a preferred implementation, the target system memory address of this scratch memory may be communicated to the remote debugger in the host computer system, for example, as part of the RESP_INIT message.

Other memory management and memory allocation schemes may be possible in an implementation of the invention.

This feature of the copy and execute scheme, having the host computer system perform memory management of the scratch memory, is unique and provides advantages. This feature is unique in that one is more likely to perform management of the scratch memory in the target computer system itself rather than on another computer system, as typically done by existing remote debuggers.

The second step of the copy and execute method of comprises placing a copy of the machine instructions into a portion of the scratch memory. The copy may be an exact replication of the instruction sequence retrieved from the target computer system, or a version of the instruction sequence modified in accordance with analyzing the instruction sequence.

The remote debugger may analyze 132 the machine instructions included in the READ_RESP message to determine a debugging sequence of the machine instructions to be placed in the copy. For example, the remote debugger may examine the machine instructions included in the requested data for conditional branch instructions that may transfer execution control out of the range of target computer system addresses that correspond to the requested data. In the copy of the machine instructions, the remote debugger may replace a conditional branch instruction with a breakpoint (BPT) instruction causing debugging control to be transferred from the target computer system to the remote debugger. Similarly, a breakpoint instruction is typically concatenated to the end of the instruction sequence causing control to transfer to the remote debugger after completing execution of the instruction sequence. Once control returns to the remote debugger, the remote debugger may issue, for example, another NDP READ request message to retrieve additional machine instructions corresponding to the conditional branch target or wait for more user debug commands.

The final step of the copy and execute method is sending the copy of the machine instructions to the target computer system and then executing that copy of the machine instructions in the target computer system. The copy of machine instructions is placed in the memory on the target computer system by issuing a series of one or more NDP WRITE request (WRITE_MEM) messages 134 from the remote debugger on the host computer system. The content of these WRITE_MEM messages comprises the copy of machine instructions. In response to completing the write memory request for each WRITE_MEM message received, the target computer system may send an NDP WRITE response (WRITE_RESP) message acknowledging receipt of the WRITE_MEM message and indicating that the write to memory request has been completed.

To execute the copy of machine instructions, the target operating system transitions to interrupt-driven mode from the current polling mode. In a preferred implementation, the target operating system may accomplish this transition to interrupt-driven mode by unmasking interrupts, i.e., by lowering the operating system IPL and calling a device driver routine to set the network hardware to interrupt-driven mode, and then restoring the operating system to a user mode or normal execution mode state, i.e., by issuing a return from interrupt (REI) instruction, as previously described. In an implementation, such as in an OpenVMS for AXP computer system, the REI instruction may cause the target operating system to restore hardware register values from an area of system reserved memory, and resume execution at the restored program counter (PC) register.

Two messages are issued by the remote debugger to accomplish this transition to interrupt-driven mode. The first message issued 136 is another WRITE_MEM message that modifies the system reserved memory corresponding to the save area from which the target operating system restores the PC. The WRITE_MEM message specifies that the target location in memory to be modified is the address of the PC to be restored. The WRITE_MEM message also specifies that the content to be written to the target location is the address of the copy of machine instructions. Note that the target operating system is in polling mode when it receives this second WRITE_MEM message. The second message issued by the remote debugger is an NDP PROCEED message 138 which instructs the target computer system to transition to interrupt-driven mode and resume executing machine instructions. Upon receipt of the PROCEED command, the target computer system unmasks interrupts, i.e., lowers the IPL and sets the network hardware to interrupt-driven mode, as part of the transition into interrupt-driven mode. The target computer system may then send an NDP PROCEED response (PROCEED_RESP) message to the host computer system acknowledging receipt of the PROCEED message, and then complete the restoration of the target operating system to a user mode or normal execution state, i.e., by executing a return from interrupt instruction. After executing the return from interrupt instruction in a preferred implementation, such as in an Alpha AXP computer system, the target computer system subsequently executes the copy of machine instructions.

The target operating system may then execute a breakpoint instruction 160 previously placed in the copy of machine instructions. As with the breakpoint instruction executed in the boot code, control may then be transferred to a previously established handler included in the target operating system code 49. The previously established handler may cause the target operating system to transition to polling mode once again and, for example, await more user debug commands.

The remote debugger may also keep a list of generated breakpoints that it has placed at specific target system memory addresses in the copy of machine instructions that are executed on the target computer system. This list enables the remote debugger to distinguish one of its generated breakpoints from other breakpoints, such as user specified breakpoints. For example, the remote debugger may receive an NDP report message from the target computer system indicating that the target computer system has executed a BPT instruction (BPT_RPT message) at a target system memory address. To respond to the breakpoint, the remote debugger may need to determine whether the breakpoint instruction is a user specified breakpoint or a generated breakpoint by comparing the target system memory address included in the BPT_RPT message to a target system memory address included in the list of generated breakpoints.

Figure 8:
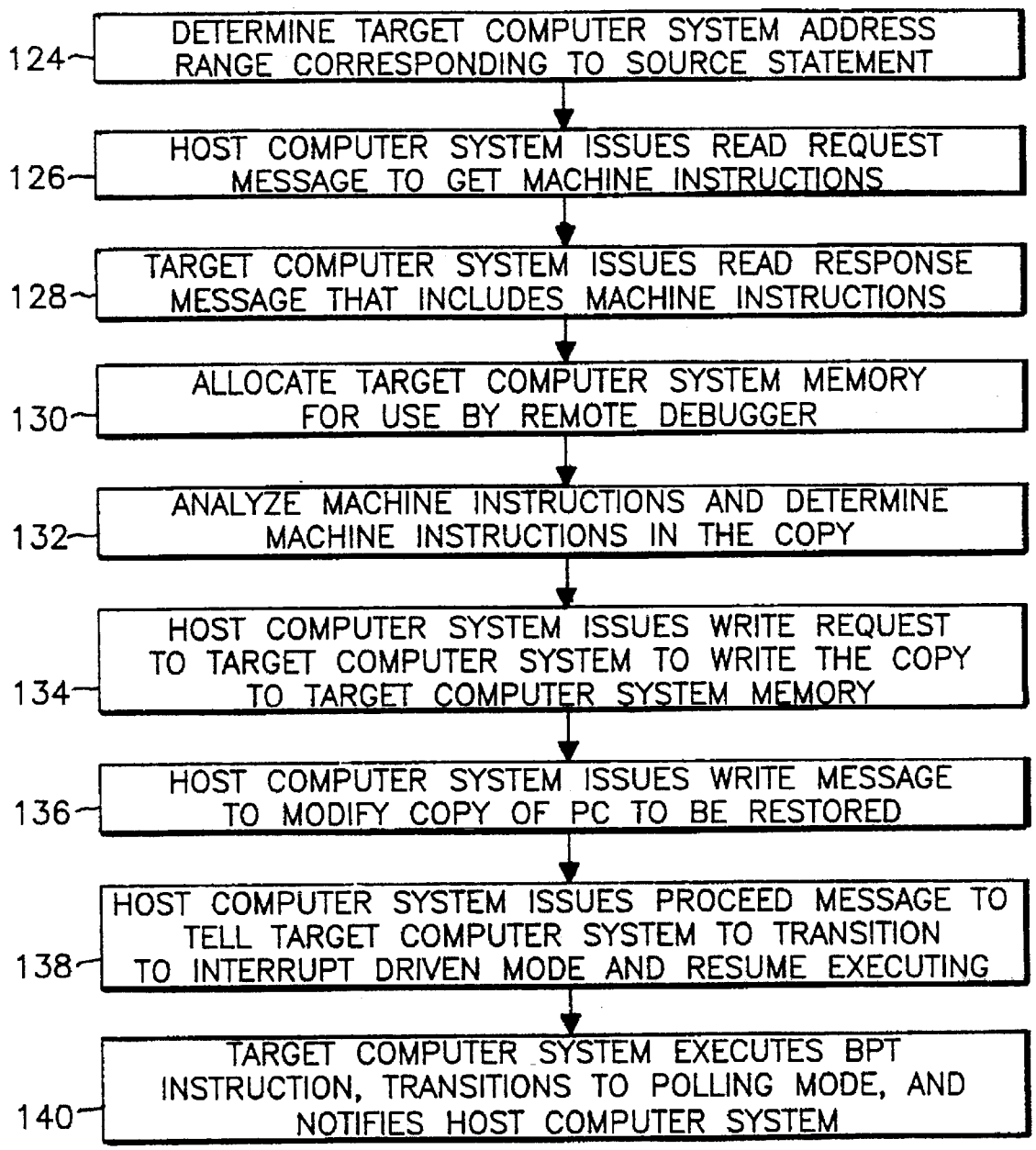
FIG. 8 is a flowchart outlining a user debug STEP command in accordance with a preferred embodiment.

The foregoing series of messages exchanged, as outlined in FIG. 8, to execute the STEP command allocates tasks to the host computer system rather than the target computer system. This facilitates problem isolation by allowing problems encountered on the target computer system during software testing to more readily be attributed to the software being tested. By performing debugging tasks, such as management of the scratch memory, in the host computer system, debugging on the target computer system may focus on the software being tested rather than focus on the implementation details, such as management of the allocated memory to execute instructions on the target computer system. Allocating tasks performed during testing to the host computer system minimizes the amount of work required for problem isolation.

Another advantage afforded by allocating tasks to the host computer system rather than the target computer system is that the testing environment may more closely replicate actual use environment. By shifting debugging tasks that require additional computer memory, such as management of the scratch memory area, to the host computer system, the memory configuration of the target computer system more closely replicates a non-debugging memory configuration.

Yet another advantage of the copy and execute method of the invention is the ability to associate a private copy of machine instructions with a specific CPU, for example, when single stepping through source code on a multiprocessor target computer system. When testing software in a multiprocessor computer system, it may be necessary to have multiple CPUs executing the same sequence of machine instructions simultaneously and to associate an executed breakpoint instruction with a specific CPU. Existing remote debuggers typically write a breakpoint instruction to the actual machine executable code rather than write a breakpoint instruction to a private copy. Thus, any one of the plurality of CPUs may execute a breakpoint instruction written to the actual machine executable code, i.e. a tested may be unable to detect which CPU executed a particular breakpoint instruction. The remote debugger embodying the invention writes a breakpoint instruction within a private copy of machine instructions enabling each CPU to have its own private copy of the machine instruction sequence being executed. While performing management of the scratch memory on the target computer system, the remote debugger may associate a specific copy at an address with a specific CPU.

This capability is desirable while debugging code in a multiprocessor computer system, for example, when there exists a problem regarding the interaction of multiple CPUs or when more than one CPU may be executing the same portion of code.

The STEP command may be one of a plurality of user debug commands that are included in an implementation in accordance with the invention. The set of user debug commands may vary with implementation of the remote debugger, such as modifying an existing debugger with an existing set of commands, and may also depend on the needs of a particular computer system configuration embodying the invention. For example, a target computer system may have its console located in an inconvenient physical location that is not in close proximity to a host computer system. While remotely debugging target operating system code, the target computer system may require rebooting from its system console which is not in close physical proximity to a remote debugger session controlling the debugging. Therefore, it is desirable to have the capability to reboot the target computer system from a remote debugger session on the host computer system. A REBOOT user debug command may provide this capability.

SET BREAKPOINT DEBUG COMMAND

Another user debug command that may be included in an embodiment of the invention is a SET BREAKPOINT command. This command lets the user specify one or more breakpoints in the target operating system code at which execution control returns to the remote debugger session, for example, to examine values of programming variables. When a user issues a command, for example "SET BREAKPOINT expression", the remote debugger performs an address translation of "expression" to determine its target system memory address.

To implement the SET BREAKPOINT command, the remote debugger then sends an NDP SET_TEMPS message to the target computer system requesting that the target computer system temporarily write a BPT instruction to the target system memory address. Functionally, the SET_TEMPS message is similar to the WRITE_MEM message in that a new value is written to a target system memory address. However the SET_TEMPS message memory write is temporary in that the target computer system saves the original value in a target system memory address before replacing it with a new value specified in the SET_TEMPS message. An original value and its corresponding memory addresses may be kept on a save list in a portion of memory that is maintained by and reserved for use by the target operating system. The target computer system may restore the original values to the target system memory if, for example, the network connection is lost, by traversing the save list and rewriting to its memory the original values.

The remote debugger may keep a list of user specified breakpoints, similar to the list of generated breakpoints previously described, for use in processing a BPT_RPT message, for example, received from the target computer system.

The target operating system may maintain the save list as a linked list, for example. A list element may be added and deleted as user breakpoints are respectively added and deleted using insertion and deletion methods for linked lists known to those skilled in the art of programming. Similarly, the remote debugger may maintain the list of generated breakpoints and the list of user specified breakpoints using a linked list data structure.

The SET_TEMPS message may generally be used to temporarily write any value to a target system memory address which may need to be restored if, for example, the network connection in a remote debugging session is lost. Data integrity is an advantage afforded by the SET_TEMPS message in that the target computer system's memory may be automatically restored to its original state if a remote debugging session is unexpectedly terminated. The target operating system may be then resume execution of a prior process, for example, by restoring its memory to its original state. If the target operating system resumes execution, the host computer system may be able to immediately re-establish its network connection by issuing, for example, a CMD_INIT message and a CONNECT message without having to reboot the target computer system.

SHOW CALLS DEBUG COMMAND

User debug commands may facilitate debugging by disclosing information about the target operating system such as displaying the active routine call frame, and displaying the contents of a hardware register, a program variable, or a target system memory location. One such user debug command is "SHOW CALLS" which displays the active routine call frame. For example, the target computer system may be currently executing a routine Y3 which was called from routine Y1. In turn, Y1 was called from a main program. The result, as displayed to the user's terminal, of executing the debugger command "SHOW CALLS" may be:
Main
Routine Y1
Routine Y3

In a preferred implementation, the remote debugger may translate this user debug command into an NDP message requesting that the target computer system execute a remote procedure call (RPC) and return the RPC results to the host computer system in the form of a response message.

The remote debugger may translate the SHOW CALLS user debug command, for example, into a series of one or more NDP messages (LIB_GET_PREVIOUS_INVO_CONTEXT message) in which each message requests that the target operating system execute an RPC that returns the invocation context of the currently active routine, i.e., what routine or program invoked the currently active routine. Each LIB_GET_PREVIOUS_INVO_CONTEXT message is sent to the target computer system. A LIB_GET_PREVIOUS_INVO_CONTEXT message may comprise, for example, a target system memory address of a routine's context block. Contained within that context block as defined by a calling standard may be an address handle identifying the name, such as an ASCII text name, of the routine's invoker. The target computer system may execute the request by calling a procedure or routine in the target computer system that returns the name of the routine's invoker. The target computer system returns to the remote debugger in the host computer system an NDP response message that comprises the invoker's name.

CACHES

In a preferred implementation, the remote debugger may use the network cache 30 of FIG. 2 to reduce the network traffic by caching RPC results thereby reducing the number of NDP messages. As previously discussed, the network cache may correspond to a portion of memory on the host computer system. The network cache may be used to store the results of an RPC call in which, given an input, the RPC always returns the same results. For subsequent calls to the same RPC with identical input, RPC results stored in the network cache may be reused rather than sending an NDP message to the target computer system requesting execution of an RPC and then sending to the host computer system a response message that includes the RPC results. By using the network cache to store RPC results during a remote debugging session, network traffic is reduced each time the RPC result is reused for a subsequent request to execute the RPC.

Problems regarding network cache implementation, such as which RPC result is displaced when the cache is full and optimal network cache size, and various solutions to these problems are known to those skilled in the art.

It should also be noted that to further reduce network traffic, a preferred implementation embodying the invention may also contain the read/write memory cache 32 of FIG. 2 for storing blocks of memory that are written and read from the target computer system. For example, a block read from the target computer system may be reused if no conflicting write operation to the same block of memory has occurred. A plurality of write operations requested, respectively, through a plurality of NDP messages, for example, may be batched into a single NDP message. Again, problems and solutions for implementing a read/write memory cache are known to those skilled in the art.

CONCLUDING REMARKS

The foregoing user debug commands and corresponding messages are illustrative of typical user debug commands of a remote debugger.

Remotely testing software, such as a testing target operating system software as previously described, has general requirements. One requirement requires a flexible testing environment to reproduce a wide range of testing environment conditions that may be needed to reproduce a problem and adequately test a solution for the problem. This requirement may include the ability to run a target operating system being tested with a large number of users, and user networking software, such as DECNET or TCP/IP, which may not function properly when the target operating system is in polling mode, i.e., when interrupts masked out, for example on OpenVMS AXP, with an IPL of 31.

A second requirement is the ability to execute user debug commands which necessitate freezing the target operating system being tested, for example, to examine system registers or single step through a portion of code being tested.

Using a network connection, such as the Ethernet, rather than a point-to-point connection, such as a serial line as used by the prior art, makes communications between a host and a target computer system for remote software testing more complex for various reasons. For example, with a network connection a message sent from a host computer system to a target computer system may be more complex because the message must identify a target computer system that may be one of a plurality of target computer systems. With a point-to-point connection, there is a single host computer system and a single target computer system, and, therefore, the message does not have to include information that identifies the target computer system. Using a network connection and a specific network device, such as an Ethernet, may create additional device dependencies and resource contentions. For example, because the embodiment uses an Ethernet, Ethernet device drivers may also be used. There must be some means by which an Ethernet device driver can identify a message as being an NDP message, and forward that message to a predetermined recipient process or routine in the target computer system. In this embodiment, a private Ethernet protocol exists which identifies an NDP message by including a unique Ethernet protocol number within the message. Further, this protocol number is registered with the Ethernet device driver to identify a routine in the network communications library which receives the NDP message.

Similarly, to use a different network device, such as FDDI, in an implementation in accordance with the invention, a protocol number for an NDP message may be registered with the other device driver routines for a particular network hardware device.

It is desirable to both satisfy the above requirements and additionally have the host and target computer systems communicate through a high bandwidth communications channel, such as a network connection, for speed and efficiency.

Given the foregoing requirements and communicating messages for remote debugging over a network, a problem may be introduced when the target computer system is in stopped or polling mode. Generally, when a network hardware device receives a message, a device interrupt is generated and signals a device driver routine to retrieve the message and forward to a proper recipient process. Because the system interrupts are masked out when the target operating system is in stopped mode, a received message may not be communicated to a recipient process by using interrupt signalling mechanism. There may be a need in remote debugging for an alternative means of message retrieval on the target computer system when the target operating system is in stopped mode. The alternative means may be device dependent and require the target computer system to change device hardware states in accordance with target operating system modes.

The invention provides solutions to these problems and satisfies the foregoing needs and requirements while communicating through a high bandwidth communications channel, such as a network connection. The invention has the dual ability to freeze the state of the target operating system, i.e., polling mode, and to run the target operating system in normal execution mode, i.e., interrupt-driven mode, while controlling remote debugging of the target operating system from a host computer system using a single network connection, such as an Ethernet network connection. To satisfy the foregoing and use an Ethernet network connection in this embodiment, the target operating system transitions between polling mode and interrupt-driven mode, and a network hardware device, such as Ethernet hardware, transitions between hardware states that properly reflect and work with the two target operating system modes providing a flexible testing environment.

In summary, the foregoing has described a remote debugging configuration comprising a host computer system and a target computer system. The two computer systems communicate by sending NDP messages over a network connection, such as an Ethernet network connection. The NDP comprises a predefined NDP message format with a network device dependent type number that identifies a message as an NDP message. Additionally, the protocol comprises a predetermined series of NDP messages that are exchanged between the host and target computer systems to execute a corresponding user debug command. The target computer system comprises untested code, such as code that comprises the target operating system. The target computer system transitions between polling mode and interrupt-driven mode. The target operating system may transition into polling mode for a plurality of reasons, such as: the target operating system has been booted and is waiting for a network connection to a host computer system, the target operating system has been frozen to enable examination of system resources, i.e., values in hardware registers, or a fatal error occurred while the target operating system was in interrupt-driven mode. The target operating system may also transition into interrupt-driven mode, for example, to execute a portion of code that comprises the target operating system and is being tested. By calling appropriate device driver routines, the target operating system may cause a network hardware device, such as an Ethernet device, to transition between polling and interrupt-driven modes as needed. A software application residing in the host computer system, such as a remote debugger, may control the debugging session and cause the target computer system to transition between polling mode and interrupt-driven mode when responding to an NDP message command sent from the host computer system or when reporting a target computer system event to the host computer system.

From the foregoing, the numerous advantages, flexibility, and wide applicability of the invention to software testing and debugging may be seen.

While a particular embodiment of the invention has been disclosed, it will be appreciated by those skilled in the art that different modifications are possible and are within the true scope and spirit of the invention as defined in the claims set forth below.

What is claimed is:

1. A method of testing software on a network comprising a target computer system and a host computer system, said target computer system comprising a target operating system and the software being tested, said host computer system comprising a host operating system and a software debugger that controls testing of said software, the method comprising:

establishing, using said software debugger, a network connection for communications between said host computer system and said target computer system;

transitioning, in response to said establishing, said target computer system into a stopped state in which it awaits input from said host computer system and in which system interrupts are masked;

issuing to said software debugged a debug command that indicates a function to be performed by said target computer system;

determining, in response to said issuing, one or more network debugging protocol messages defining steps necessary for the target computer system to perform said function indicated by said debug command;

communicating to said target computer system using said network connection said network debugging protocol messages;

performing said steps in said target computer system to complete said function indicates by said debug command;

transitioning, in response to performing said steps, the target computer system between said stopped state and an interrupt-driven state in which said target computer system is in a normal system processing and execution state and in which a network hardware device that interfaces said target computer system with said network signals interrupts; and reporting to said host computer system results of performing said steps and state information upon transitioning about said target computer system.

2. The method of claim 1, wherein said stopped state of said target computer system comprises a first target operating system state and a corresponding first network hardware state of said network hardware in said target computer system wherein said target computer system communicates over said network to said host computer system using said network hardware, said first target operating system state being a state that masks out system interrupts and freezes said target operating system, said corresponding first network hardware state in which said target computer system polls said network hardware to retrieve a message received by said target computer system.

3. The method of claim 2, wherein said interrupt-driven state of said target computer system comprises a second operating system state and a corresponding second network hardware state of said network hardware, said second operating system state being a state that does not mask out system interrupts and represents a normal operating system processing and execution mode, said corresponding second network hardware state in which said network hardware functions as an interrupt-driven device when a message is received by said target computer system.

4. The method of claim 1, wherein said network debugging protocol messages include device protocol data corresponding to a device protocol layer, said network connection is an Ethernet network connection and said device protocol data includes a protocol type number that identifies said network debugging protocol as an Ethernet messaging protocol, and wherein said target computer system communicates with said host computer system over said network using Ethernet hardware.

5. The method of claim 1 wherein said software debugger comprises a main debugger and a secondary debugger, and wherein said main debugger translates said debug command into messages, performs said determining step, and calls said secondary debugger to interface with a first network library that resides in said host computer system to package messages to be sent to said target computer system.

6. The method of claim 5 wherein a second network library resides in said target computer system, and the method further comprises calling, by said secondary debugger, routines in said first network library to communicate a network debugging protocol message to said target system using said network connection, said network debugging protocol message being one of said network debugging protocol messages; and retrieving and passing by said secondary debugger said network debugging protocol message to said target operating system.

7. The method of claim 6 further comprising packaging, using routines from said first and second network libraries, said network debugging protocol message to be communicated between said host and target computer systems, said packaging comprising placing a message header and message trailer in said network debugging protocol message, said message header including a value that represents the quantity of bytes of user data included in said network debugging protocol message.

8. The method of claim 1 wherein said debug command is a single step debug command and the method further comprises single stepping through a portion of said software being tested.

9. The method of claim 1 further comprising said target computer system sending, in response to one of said network debugging protocol messages, a reply network debugging protocol message that acknowledges receipt of said one of said network debugging protocol messages.

10. The method of claim 1 wherein said establishing further comprises:
communicating, by said host computer system, a first network connection request network debugging protocol message to said target computer system to establish said network connection; and
acknowledging, by said target computer system, receipt of said first network connection request network debugging protocol message by sending a first initialization response network debugging protocol message that comprises a first incarnation number identifying a particular boot of the target computer system and a connection status that indicates acceptance or rejection of said first network connection request network debugging protocol message.

11. The method of claim 10 wherein said first initialization response network debugging protocol message indicates acceptance of said first network connection request network debugging protocol message, and the method further comprises:
storing, by said host computer system, said first incarnation number received in said first initialization response network debugging protocol message;
detecting, by said host computer system, that said network connection is lost; and
re-establishing, coupled to said storing step, said network connection using said first incarnation number by:
sending, by said target computer system, a second network connection request network debugging protocol message to said target computer system;
receiving, from said target computer system, a second initialization response network debugging protocol message comprising a second incarnation number;
determining, by said host computer system, if said first and said second incarnation numbers are equivalent by comparing them;
terminating, by said host computer system in response to said determining, said remote debugging session if said first and second incarnation numbers are not equivalent; and
continuing, by said host computer system in response to said determining, said remote debugging session if said first and second incarnation numbers are equivalent.

12. The method of claim 10 wherein said first network connection request network debugging protocol message comprises a first password, and the method further comprising determining, by said target computer system, if said first password is valid by searching, in said target computer system, for a second password that matches said first password, and wherein, as a result of said determining, said connection status indicates a rejection of said first network connection request network debugging protocol message if said first password is not valid.

13. The method of claim 1 further comprising said target computer system sending a report network debugging protocol message to said host computer system, said report network debugging protocol message being initiated by said target computer system due to an occurrence of one or more events in said target computer system.

14. The method of claim 13 wherein said report network debugging protocol message indicates that a breakpoint instruction has been executed in said target computer system returning control to said host computer system for other debug commands.

15. The method of claim 14 wherein said report network debugging protocol message indicates that an operating system exception has occurred while executing said target operating system.

16. The method of claim 1, wherein said host computer system includes a host memory, said messages include a remote procedure call network debugging protocol message that requests the target computer system to execute a remote procedure call and produce a result, said remote procedure call network debugging protocol message comprising a routine name of the remote procedure to be executed and a corresponding routine parameter, and the method further comprises communicating, by said target computer system to said host computer system, a first remote procedure call response network debugging protocol message that includes said result, said result used by said software debugger to perform said debug command; and storing, by said software debugger in said host memory, said result and said corresponding routine parameter;

issuing another debug command and determining additional network debugging protocol messages wherein said additional network debugging protocol messages include another remote procedure call network debugging protocol message that requests the target computer system to execute said remote procedure using said corresponding routine parameter; and using said result from said storing step to perform the other debug command rather than communicate another remote procedure call network debugging protocol message to execute said remote procedure.

17. The method of claim 1, wherein said debug command is a step command that requests execution in said target computer system of one or more machine instructions that correspond to a portion of said software being tested, said target computer system has a target memory, and the method further comprises:

sending, from said host computer system to said target computer system, a read request network debugging protocol message to read a first portion of said machine instructions from said first memory;

responding by sending to said host computer system a read acknowledgement network debugging protocol message that includes said first portion of said machine instructions;

allocating, in said target computer system, a first segment of target memory;

analyzing, by said software debugger, said first portion of machine instructions to determine the execution flow of said machine instructions and determining a location of an exit point in said first portion;

writing, by issuing a write memory request network debugging protocol message to said target computer system, a modified copy of said first portion of said machine instructions to said first segment of target memory wherein said modified copy contains a breakpoint instruction at said location to cause execution control to transfer to said target operating system;

communicating, from said host computer system, a write request network debugging protocol message to modify a save area in said target memory that contains an address at which the target computer system is to resume execution;

communicating, from said host computer system, a proceed network debugging protocol message that causes the target computer system to transition to said interrupt-driven state and resume executing machine instructions at said address in said save area; and communicating, in response to said target computer system executing said breakpoint, a report network debugging protocol message to said host computer system and said target computer system transitioning into said stopped state.

18. The method of claim 1 further comprising said software debugger syntactically and semantically verifying for correctness said debug command.

19. The method of claim 1, wherein said software being tested comprises a portion of said target operating system.

20. An apparatus for testing software on a network that comprises a target computer system and a host computer system, said target computer system comprising a target operating system and the software being tested, said host computer system comprising a host operating system and a software debugger that controls testing of said software, the apparatus comprising:

establishing means for establishing, using a software debugger, a network connection for communications between said host computer system and said target computer system;

transitioning means for transitioning, in response to said establishing means, said target computer system into a stopped state in which it awaits input from said host computer system and in which system interrupts are masked;

issuing means for issuing to said software debugger a debug command that indicates a function to be performed by said target computer system;

determining means for determining, in response to said issuing means, one or more network debugging protocol messages defining steps necessary for the target computer system to perform said function indicated by said debug command;

communicating means for communicating to said target computer system using said network connection said network debugging protocol messages;

performing means for performing said steps in said target computer system to complete said function indicating by said debug command;

transitioning means for transitioning, in response to performing means, the target computer system between said stopped state and an interrupt-driven state in which said target computer system is in a normal system processing and execution state and in which a network hardware device that interfaces said target computer system with said computer network signals interrupts; and reporting means for reporting to said host computer system results of said performing means performing said steps and state information upon transitioning about said target computer system.

21. The apparatus of claim 20, wherein said target computer system includes a first memory and the apparatus further comprises temporary write memory means for temporarily writing a user specified breakpoint to a first address in said first memory by storing original contents of said first address at a second address prior to writing said user specified breakpoint to said first address; and restoration means, coupled to said temporary write means, for restoring said original contents to said first address by using said contents that is saved at said second address if said network connection is lost.

22. The apparatus of claim 20 further comprising a breakpoint detection means that causes said target computer system to transition to said stopped state, said breakpoint detection means comprising:

determining means, coupled to said establishing means, for determining if an executed breakpoint instruction is included in boot code in said target operating system, and if said network connection is established;

reporting means, coupled to said determining means, in said target computer system for issuing a report network debugging protocol message to said host computer system indicating execution of a breakpoint instruction if said network connection is established;

acknowledging means in said host computer system for sending an acknowledgement network debugging protocol message that indicates acceptance or rejection of said breakpoint instruction if said breakpoint instruction is not included in said boot code, and said network debugging protocol message comprising another series of network debugging protocol messages if said breakpoint instruction is included in said boot code.

* * * * *